US012809138B2

(12) United States Patent
Nakada et al.

(10) Patent No.: US 12,809,138 B2
(45) Date of Patent: Nov. 24, 2026

(54) ZOOM LENS, AND IMAGE PICKUP APPARATUS HAVING THE SAME

(71) Applicant: CANON KABUSHIKI KAISHA, Tokyo (JP)

(72) Inventors: Takeharu Nakada, Tochigi (JP); Shunji Iwamoto, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 362 days.

(21) Appl. No.: 18/508,283

(22) Filed: Nov. 14, 2023

(65) Prior Publication Data

US 2024/0176118 A1 May 30, 2024

(30) Foreign Application Priority Data

Nov. 25, 2022 (JP) ................................ 2022-188559

(51) Int. Cl.
*G02B 15/14* (2006.01)

(52) U.S. Cl.
CPC ............................ *G02B 15/144511* (2019.08)

(58) Field of Classification Search
CPC .............................................. G02B 15/144511
USPC .......................................................... 359/686
See application file for complete search history.

(56) References Cited

U.S. PATENT DOCUMENTS

| | | | | |
|---|---|---|---|---|
| 9,217,851 | B2 | 12/2015 | Iwamoto | |
| 10,078,202 | B2 | 9/2018 | Iwamoto | |
| 10,416,421 | B2 | 9/2019 | Iwamoto | |
| 10,663,703 | B2 | 5/2020 | Iwamoto | |
| 10,754,169 | B2 | 8/2020 | Iwamoto | |
| 11,131,829 | B2 | 9/2021 | Iwamoto | |
| 11,181,717 | B2 | 11/2021 | Iwamoto | |
| 11,841,489 | B2 | 12/2023 | Iwamoto | |
| 2012/0019931 | A1 * | 1/2012 | Ogata ............ | G02B 15/144105 359/684 |
| 2014/0055659 | A1 | 2/2014 | Iwamoto | |
| 2014/0152887 | A1 | 6/2014 | Hagiwara | |

(Continued)

FOREIGN PATENT DOCUMENTS

| | | |
|---|---|---|
| JP | 2011059496 A | 3/2011 |
| JP | 2012-027262 A | 2/2012 |

(Continued)

OTHER PUBLICATIONS

Notice of Reasons for Refusal issued by the Japanese Patent Office on Dec. 2, 2025 in corresponding JP Patent Application No. 2022-188559 with English translation.

(Continued)

*Primary Examiner* — George G. King
(74) *Attorney, Agent, or Firm* — Carter, DeLuca & Farrell LLP

(57) ABSTRACT

A zoom lens comprising a plurality of lens units. The plurality of lens units consists of, in order from an object side to an image side, a first lens unit having negative refractive power, a second lens unit having positive refractive power, a third lens unit having negative refractive power, and a fourth lens unit having positive refractive power. A distance between adjacent lens units changes during zooming from a wide-angle end to a telephoto end. The first lens unit includes three or more lenses. The first lens unit is fixed relative to an image plane during zooming. A predetermined inequality is satisfied.

17 Claims, 27 Drawing Sheets

(56) References Cited

U.S. PATENT DOCUMENTS

| | | | | |
|---|---|---|---|---|
| 2018/0074300 | A1 | 3/2018 | Gyoda | |
| 2021/0018721 | A1 | 1/2021 | Shinzato | |
| 2022/0236544 | A1* | 7/2022 | Nagami | G02B 15/143507 |
| 2023/0010047 | A1 | 1/2023 | Iwamoto | |
| 2023/0020736 | A1 | 1/2023 | Nakada | |
| 2023/0266583 | A1 | 8/2023 | Iwamoto | |
| 2023/0384570 | A1 | 11/2023 | Iwamoto | |
| 2024/0053591 | A1 | 2/2024 | Iwamoto | |
| 2024/0061224 | A1 | 2/2024 | Iwamoto | |
| 2024/0159996 | A1 | 5/2024 | Iwamoto | |
| 2024/0192474 | A1 | 6/2024 | Iwamoto | |
| 2024/0248288 | A1* | 7/2024 | Ohtake | G02B 13/18 |
| 2025/0199275 | A1* | 6/2025 | Sashima | G02B 13/18 |

FOREIGN PATENT DOCUMENTS

| | | | |
|---|---|---|---|
| JP | 4886346 | B2 | 2/2012 |
| JP | 2016090591 | A | 5/2016 |
| JP | 2019-120823 | A | 7/2019 |
| JP | 2019159046 | A | 9/2019 |
| JP | 2020-101750 | A | 7/2020 |
| JP | 2022112484 | A | 8/2022 |
| JP | 2023-044106 | A | 3/2023 |
| TW | I443371 | B | 7/2014 |
| WO | 2018/078887 | A1 | 5/2018 |
| WO | 2022/172821 | A1 | 8/2022 |
| WO | 2024/053269 | A1 | 3/2024 |

OTHER PUBLICATIONS

Combined Search and Examination Report issued by the UK Intellectual Property Office on Apr. 29, 2024 in corresponding Patent Application No. GB2317355.2.

Notice of Reasons for Refusal issued by the Japanese Patent Office on Feb. 24, 2026 in corresponding JP Patent Application No. 2022-188559, with English translation.

Indian Office Action issued in corresponding IN Patent Application No. 202344078967, dated Feb. 9, 2026, with English translation.

Examination Report issued in corresponding UK Patent Application No. GB2317355.2, dated Aug. 5, 2026, pp. 1-5.

* cited by examiner

ZOOM LENS, AND IMAGE PICKUP APPARATUS HAVING THE SAME

BACKGROUND

Technical Field

One of the aspects of the embodiments relates generally to a zoom lens, and more particularly to a zoom lens suitable for an image pickup apparatus, such as a digital still camera, a digital video camera, a broadcasting camera, a surveillance camera, an on-board camera (in-vehicle camera), a film-based camera, and the like.

Description of Related Art

An imaging optical system for image pickup apparatus has recently been demanded to have a compact zoom lens with a wide angle of view and high optical performance over an overall zoom range.

Japanese Patent Laid-Open No. 2020-101750 discloses a negative lead type wide-angle zoom lens that includes a first lens unit having negative refractive power disposed closest to an object as a zoom lens with a compact overall system in which a wide angle of view is easy.

The negative lead type wide-angle zoom lens proposed in Japanese Patent Laid-Open No. 2020-101750 has a wide angle of view and high optical performance by moving the first lens unit having negative refractive power during zooming from a wide-angle end to a telephoto end.

However, the configuration of moving the large and heavy first lens unit as in the wide-angle zoom lens described in Japanese Patent Laid-Open No. 2020-101750 complicates a moving mechanism and is disadvantageous from the viewpoint of miniaturization and weight reduction.

SUMMARY

A zoom lens according to one aspect of the embodiment comprising a plurality of lens units. The plurality of lens units consists of, in order from an object side to an image side, a first lens unit having negative refractive power, a second lens unit having positive refractive power, a third lens unit having negative refractive power, and a fourth lens unit having positive refractive power. A distance between adjacent lens units changes during zooming from a wide-angle end to a telephoto end. The first lens unit includes three or more lenses. The first lens unit is fixed relative to an image plane during zooming. The following inequalities are satisfied:

$$0.85<(-f1)/f2<2.00$$

$$0.00<(-f1)/f4<0.55$$

$$0.00<LD1/TTL<0.27$$

where f1 is a focal length of the first lens unit, f2 is a focal length of the second lens unit, f4 is a focal length of the fourth lens unit, LD1 is a distance on an optical axis from a lens surface on the object side of a lens closest to an object in the first lens unit to a lens surface on the image side of a lens closest to the image plane in the first lens unit, and TTL is a distance on the optical axis from the lens surface on the object side of the lens closest to the object in the zoom lens at the wide-angle end to the image plane. An image pickup apparatus having the above zoom lens also constitutes another aspect of the embodiment.

Further features of the disclosure will become apparent from the following description of embodiments with reference to the attached drawings.

DESCRIPTION OF THE EMBODIMENTS

Figure 1:
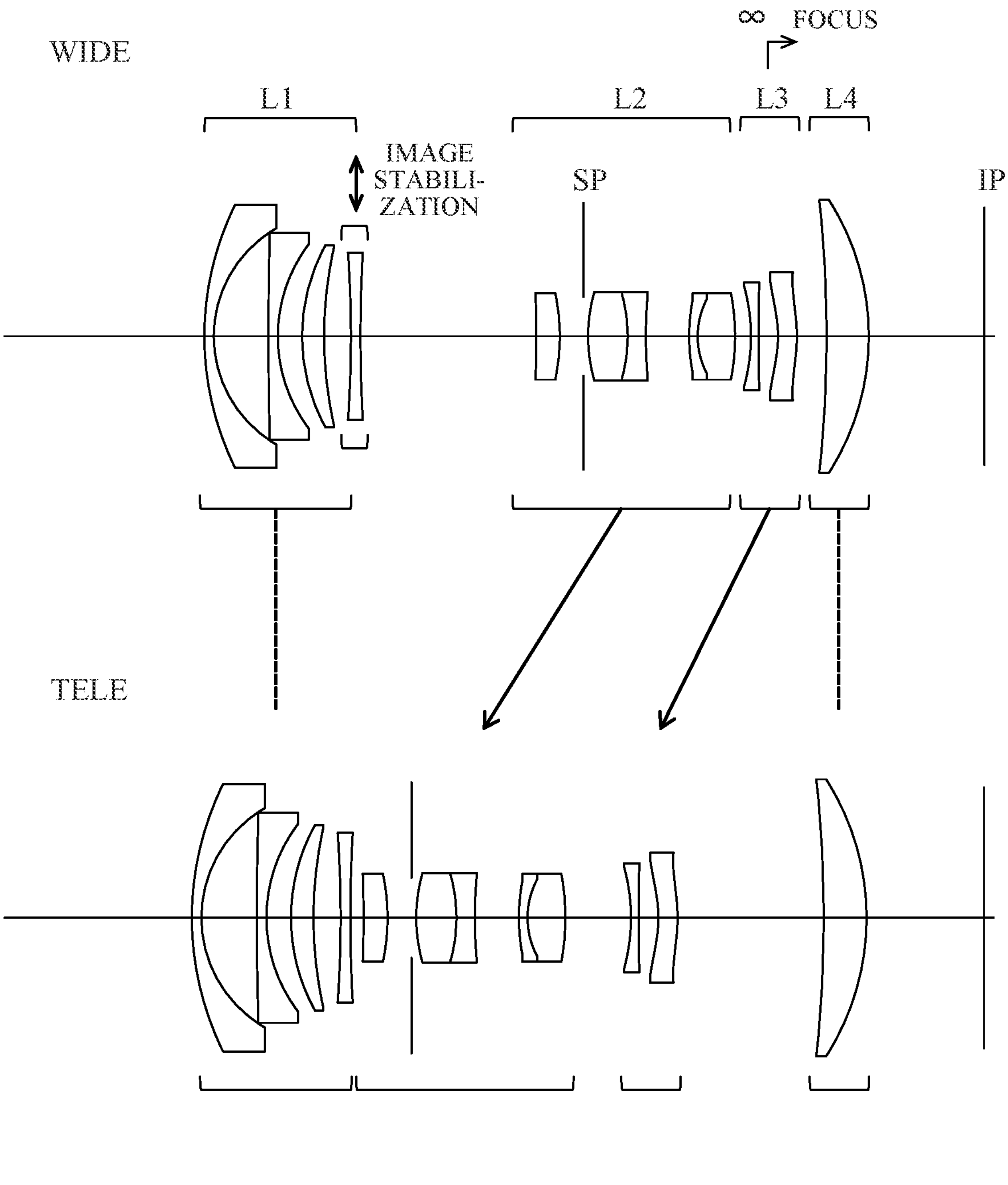
FIG. 1 is a lens sectional view in an in-focus state on the infinity object at a wide-angle end and a telephoto end according to Example 1.
Figure 2A:
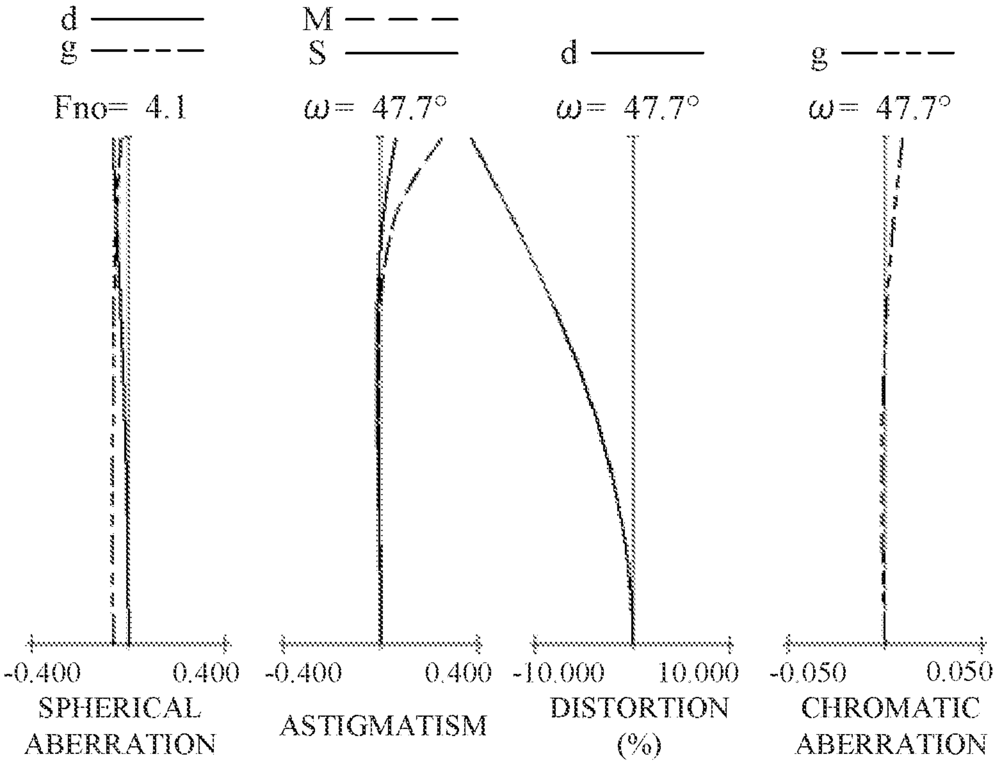
FIGS. 2A and 2B are longitudinal aberration diagrams in the in-focus state on the infinity object at the wide-angle end and telephoto end according to Example 1, respectively.
Figure 2B:
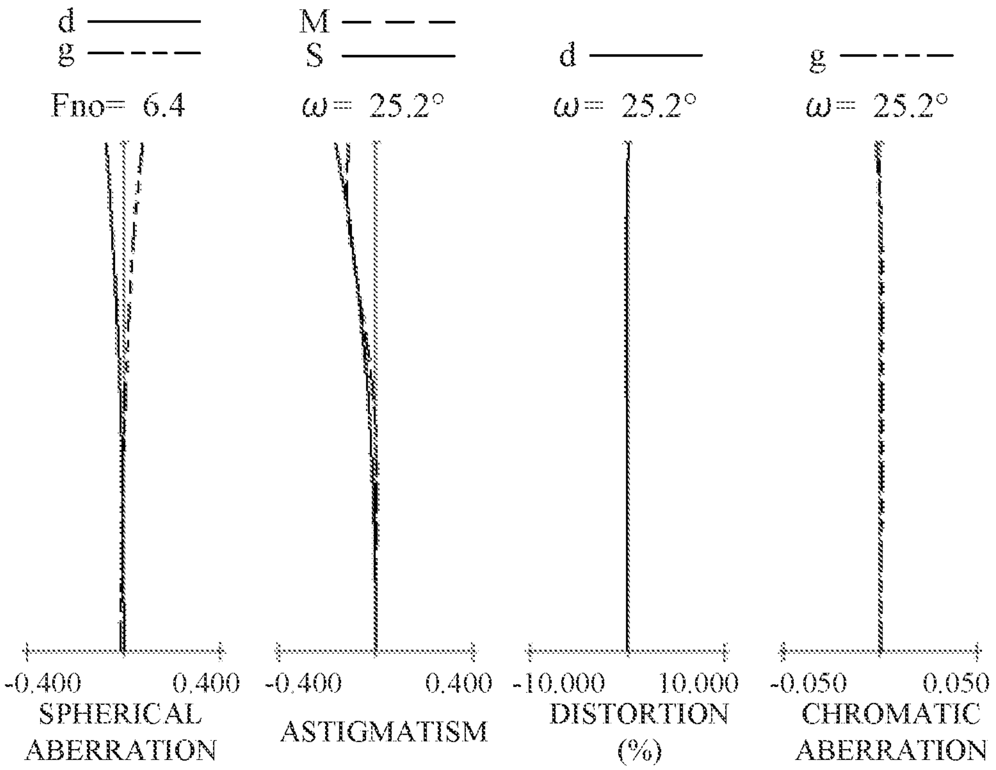
Figure 3:
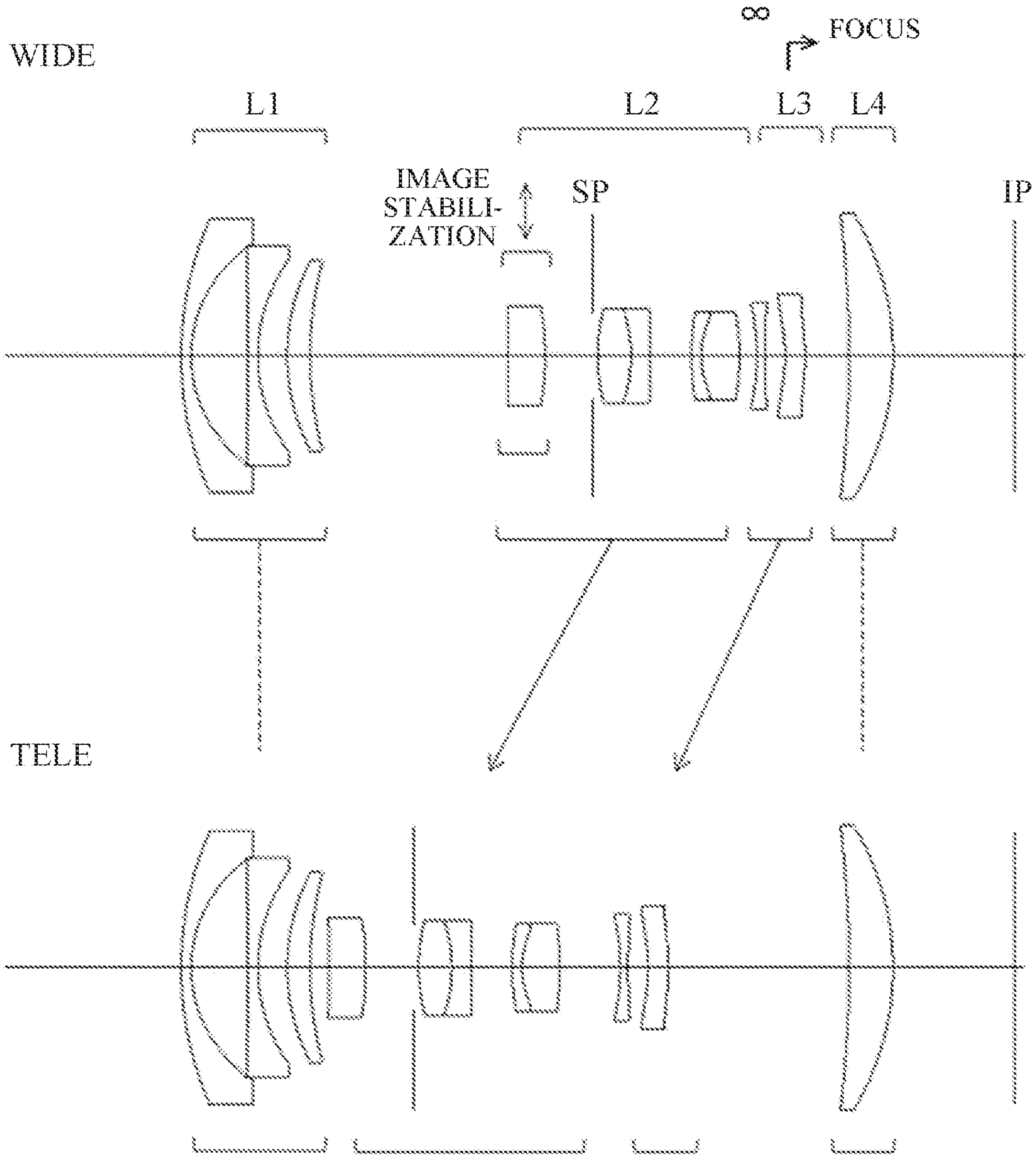
FIG. 3 is a lens sectional view in an in-focus state on the infinity object at a wide-angle end and a telephoto end according to Example 2.
Figure 4A:
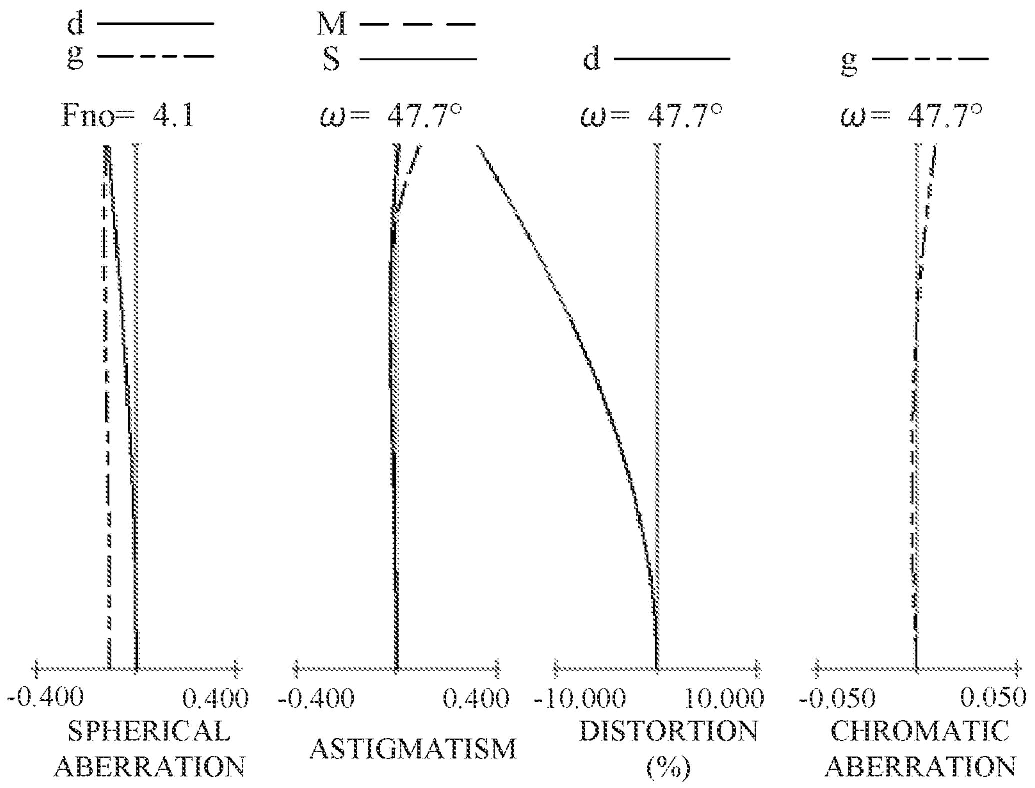
FIGS. 4A and 4B are longitudinal aberration diagrams in the in-focus state on the infinity object at the wide-angle end and telephoto end according to Example 2, respectively.
Figure 4B:
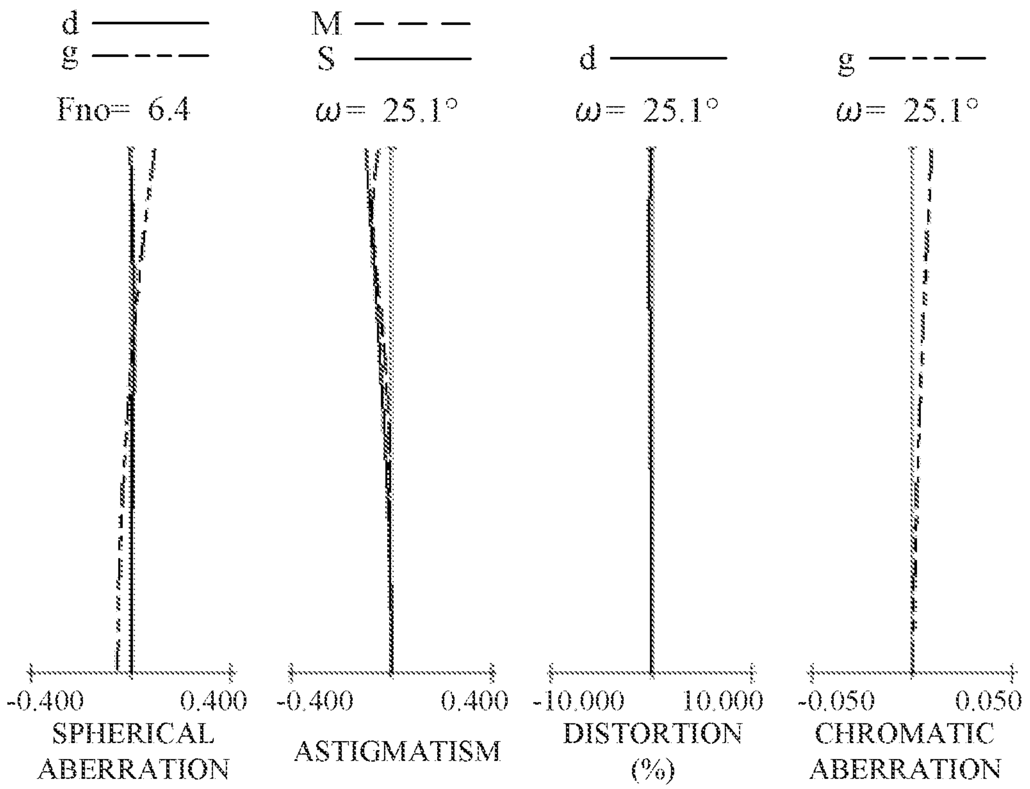
Figure 5:
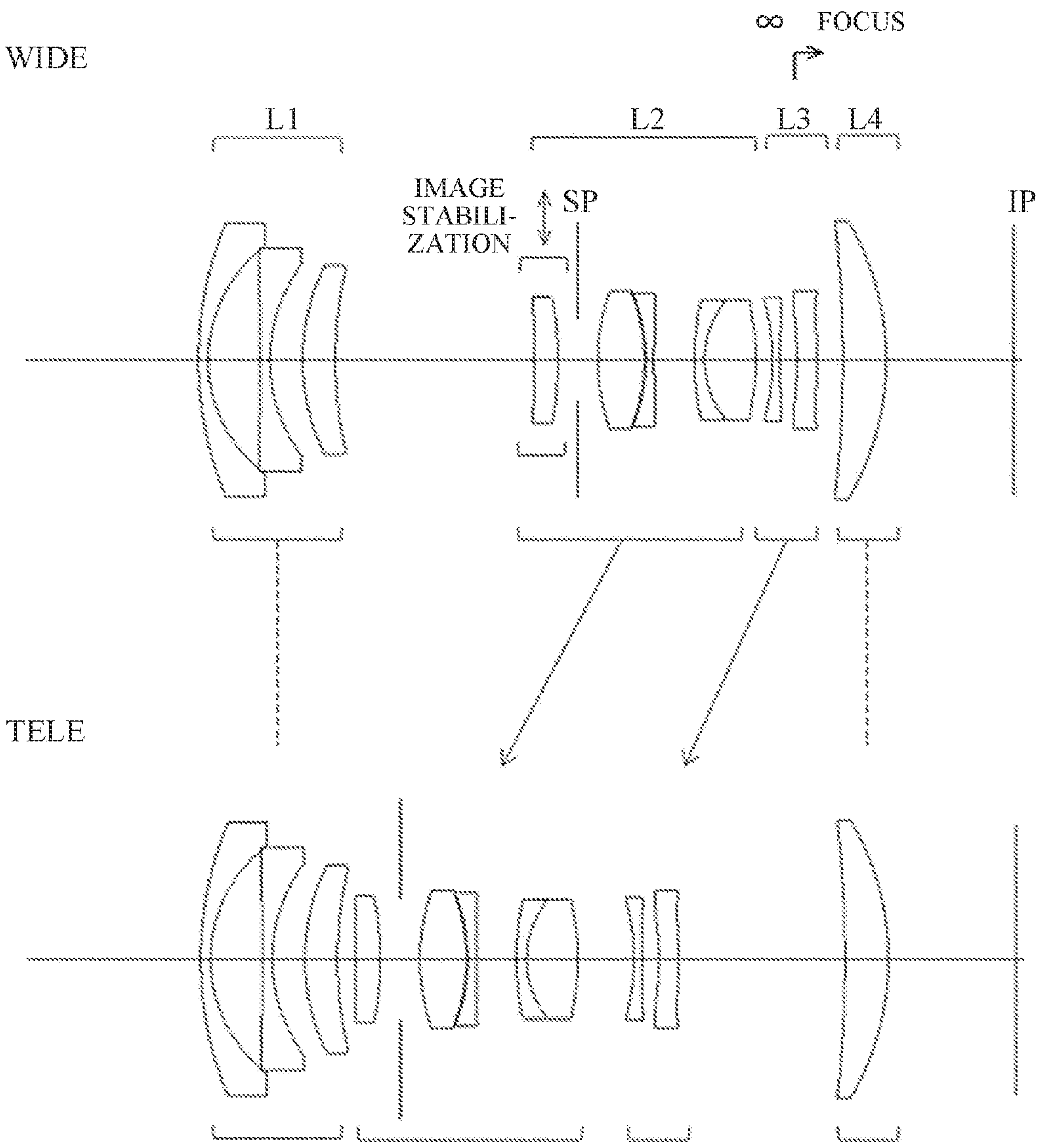
FIG. 5 is a lens sectional view in an in-focus state on the infinity object at a wide-angle end and a telephoto end according to Example 3.
Figure 6A:
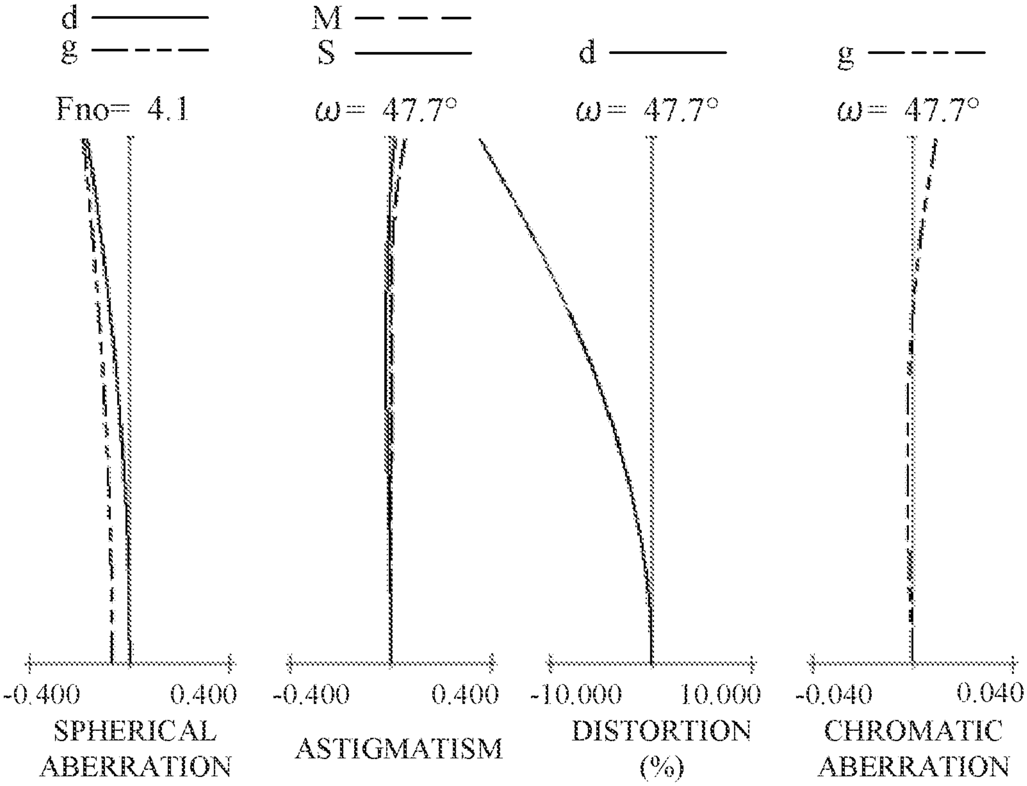
FIGS. 6A and 6B are longitudinal aberration diagrams in the in-focus state on the infinity object at the wide-angle end and telephoto end according to Example 3, respectively.
Figure 6B:
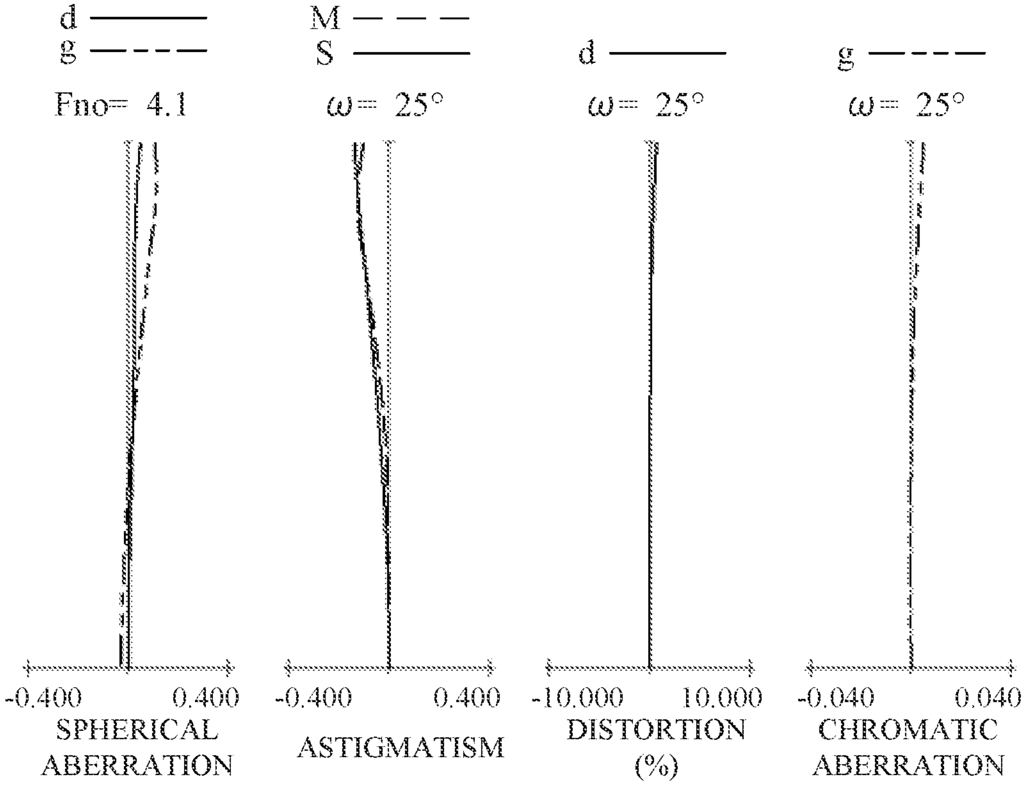
Figure 7:
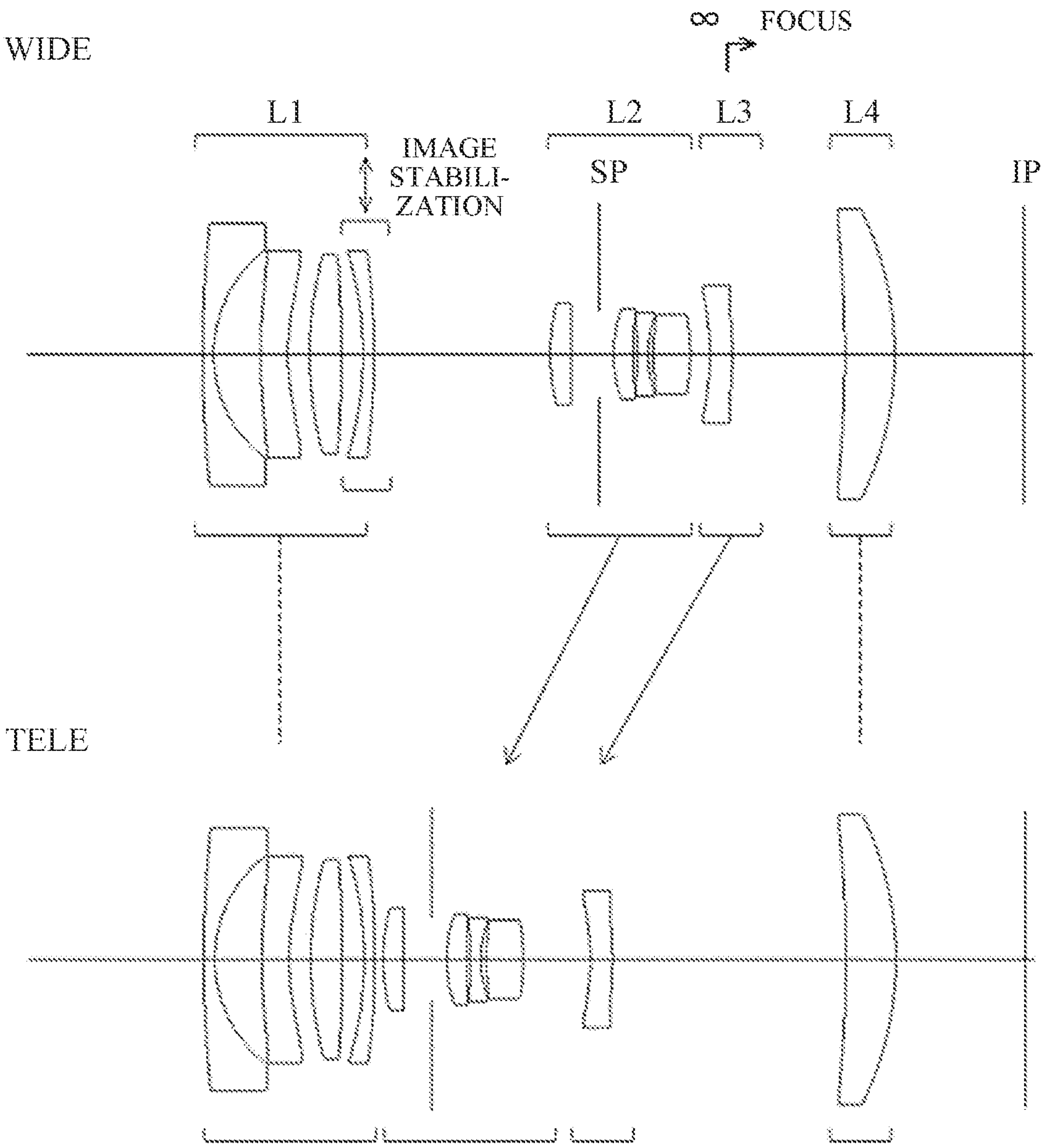
FIG. 7 is a lens sectional view in an in-focus state on the infinity object at a wide-angle end and a telephoto end according to Example 4.
Figure 8A:
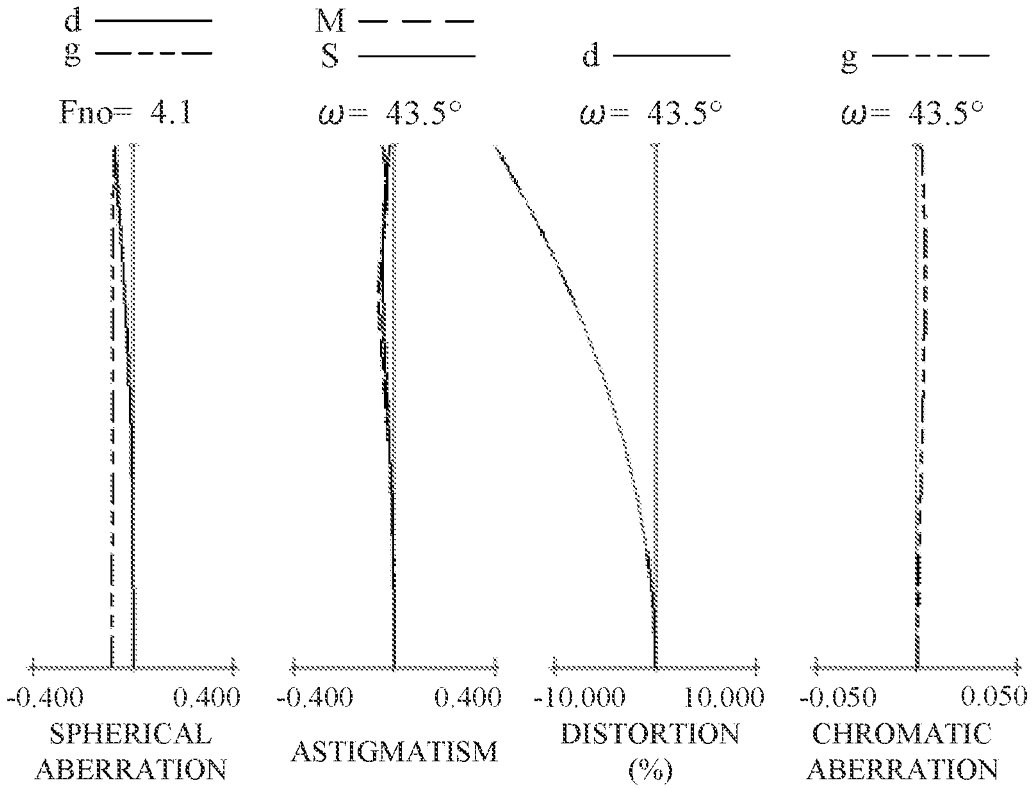
FIGS. 8A and 8B are longitudinal aberration diagrams in the in-focus state on the infinity object at the wide-angle end and telephoto end according to Example 4, respectively.
Figure 8B:
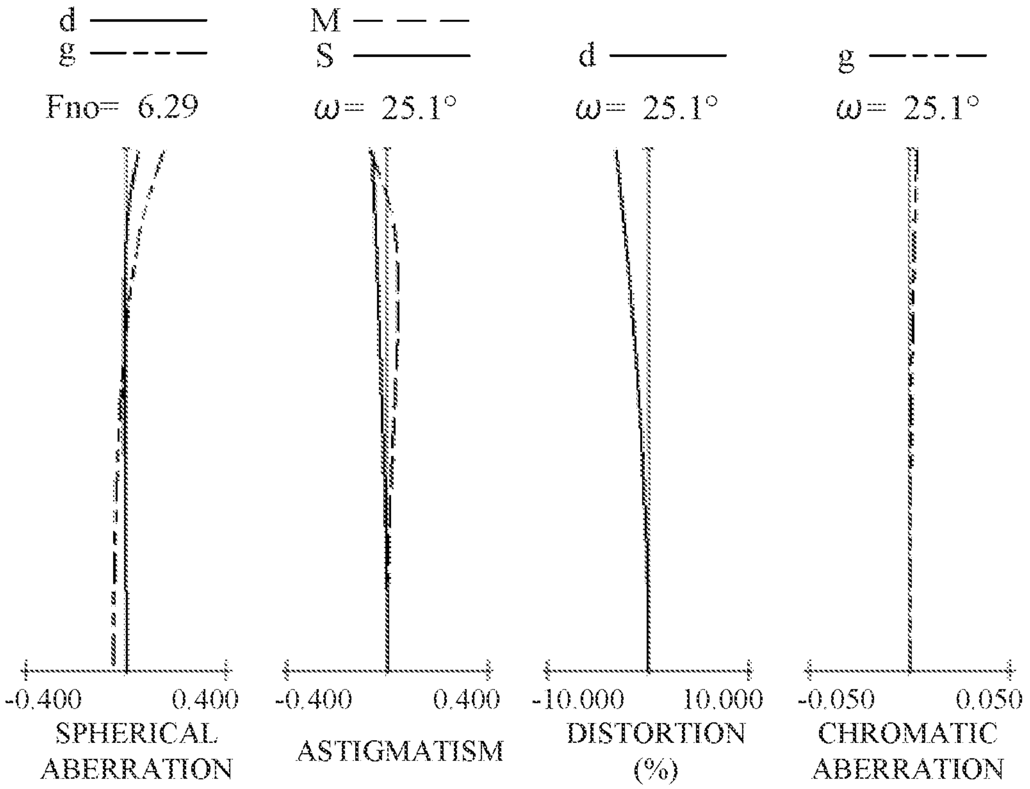
Figure 9:
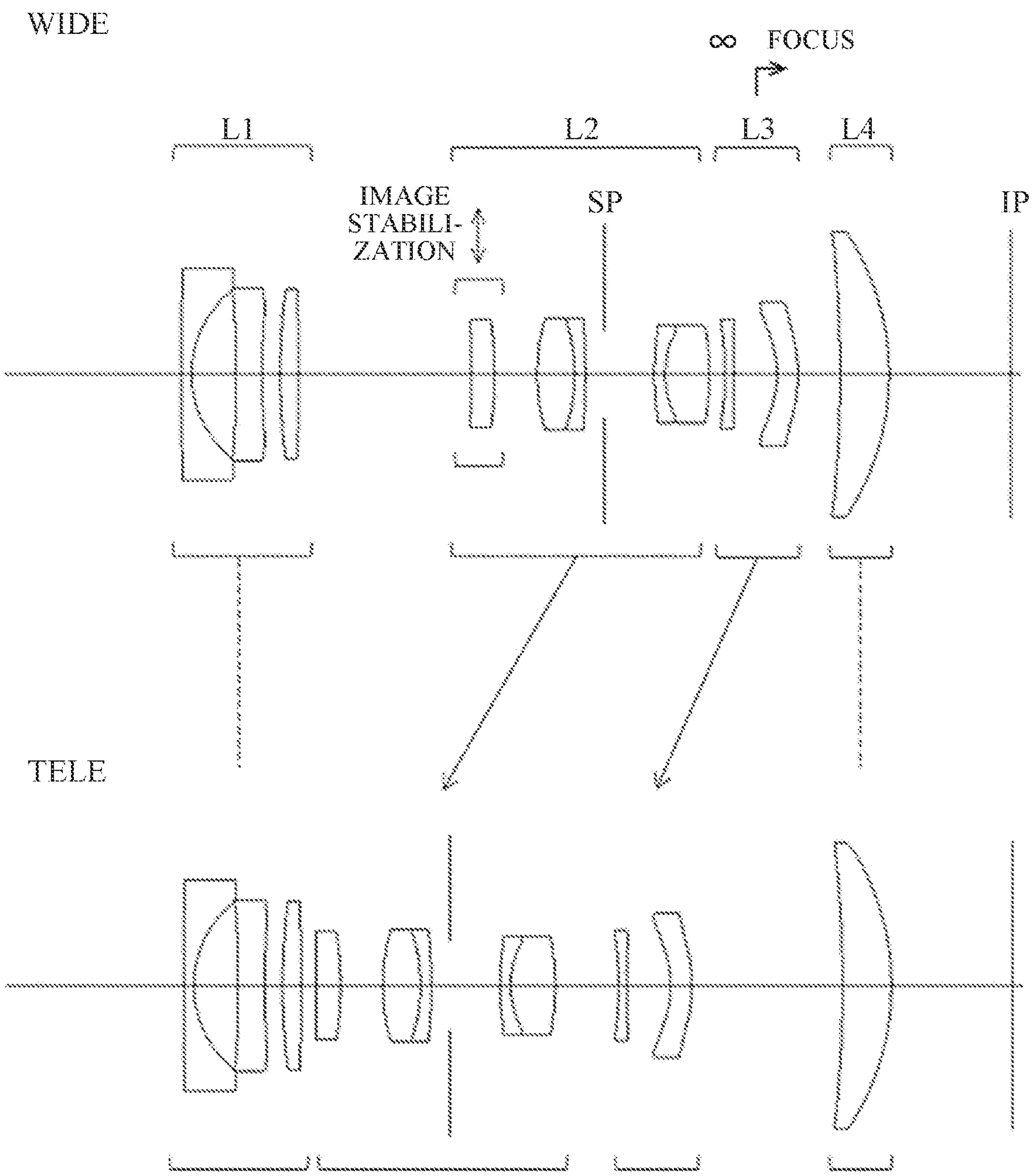
FIG. 9 is a lens sectional view in an in-focus state on the infinity object at a wide-angle end and a telephoto end according to Example 5.
Figure 10A:
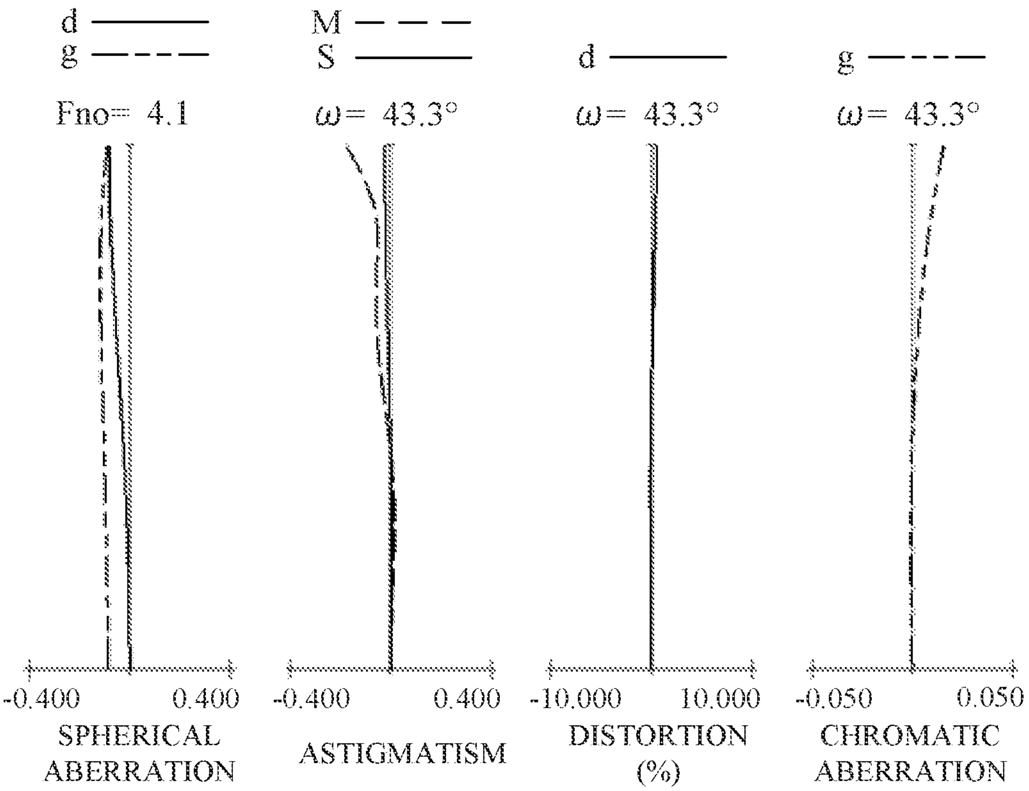
FIGS. 10A and 10B are longitudinal aberration diagrams in the in-focus state on the infinity object at the wide-angle end and telephoto end according to Example 5, respectively.
Figure 10B:
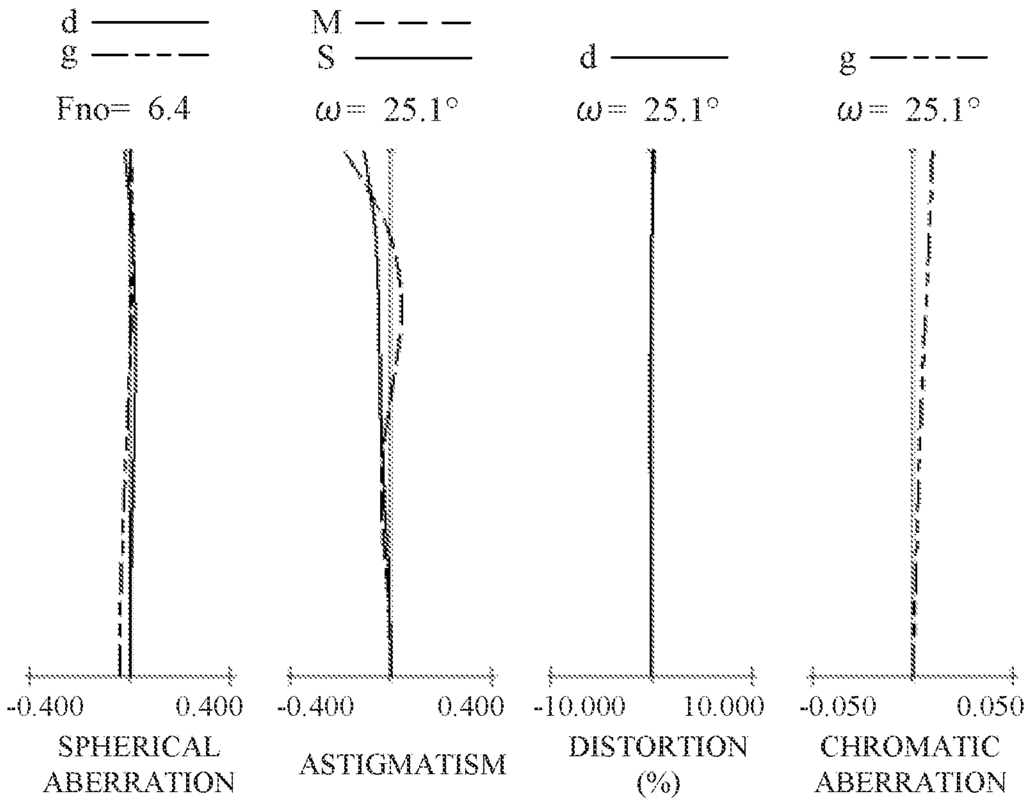
Figure 11:
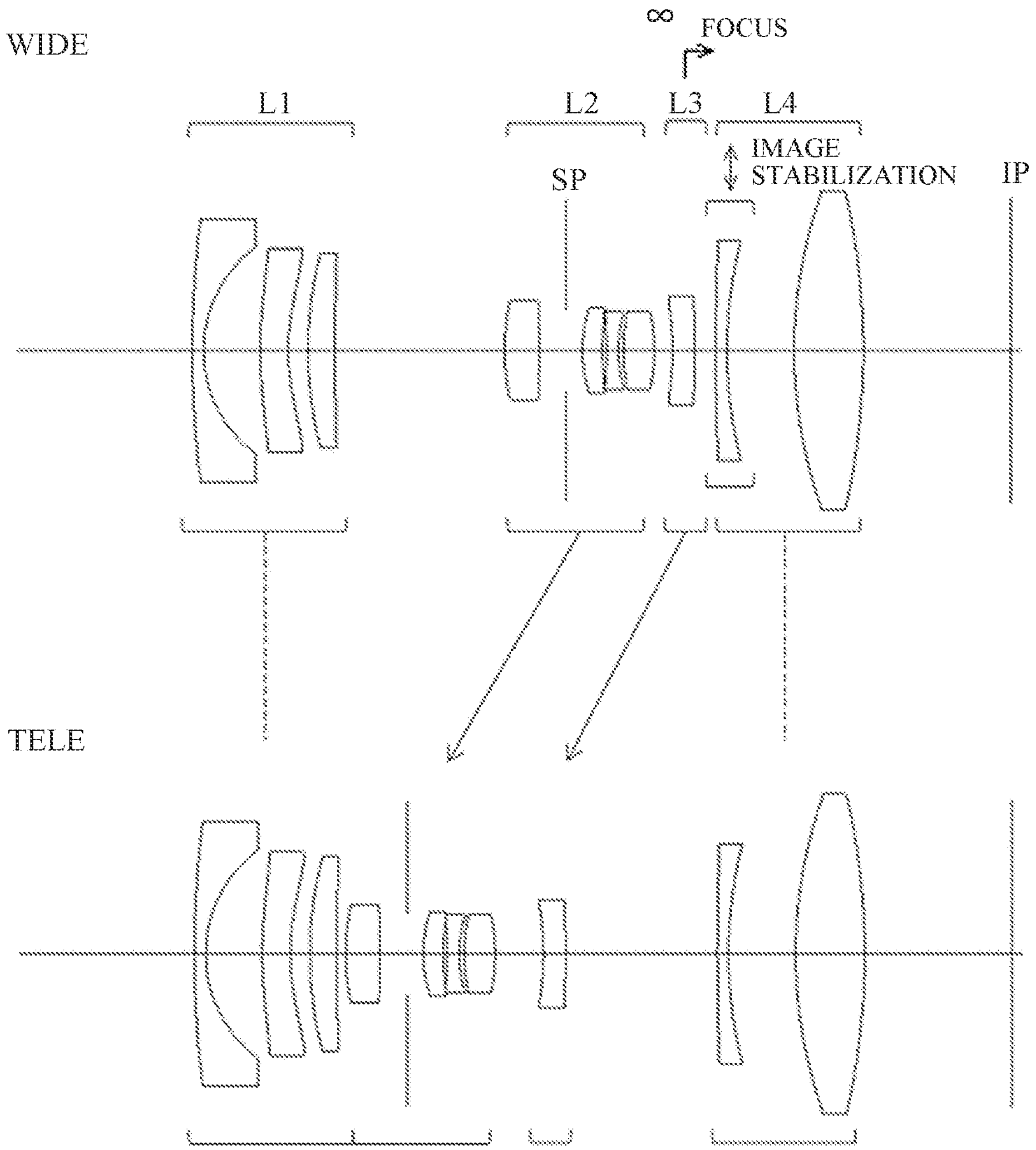
FIG. 11 is a lens sectional view in an in-focus state on the infinity object at a wide-angle end and a telephoto end according to Example 6.
Figure 12A:
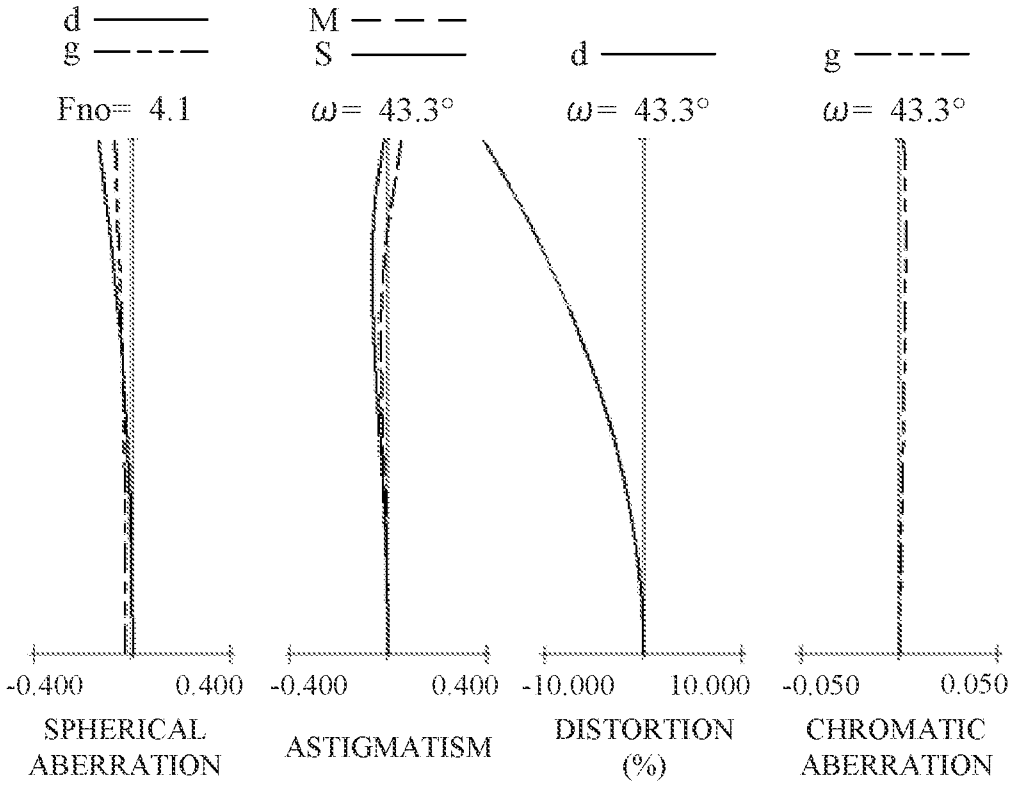
FIGS. 12A and 12B are longitudinal aberration diagrams in the in-focus state on the infinity object at the wide-angle end and telephoto end according to Example 6, respectively.
Figure 12B:
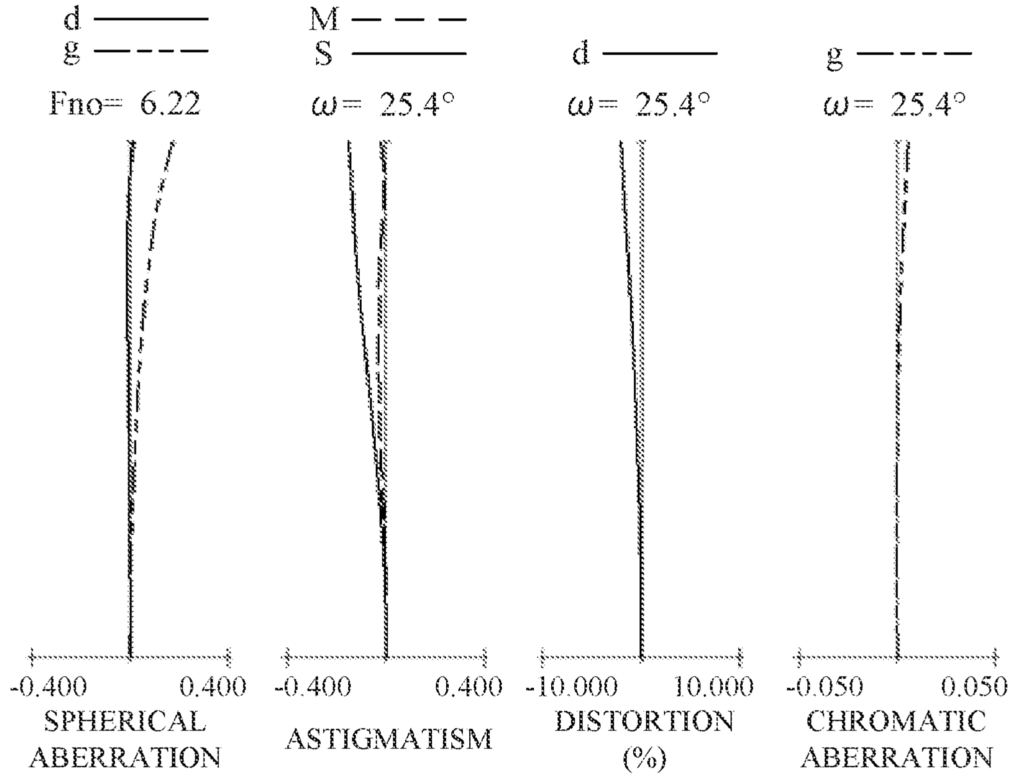
Figure 13:
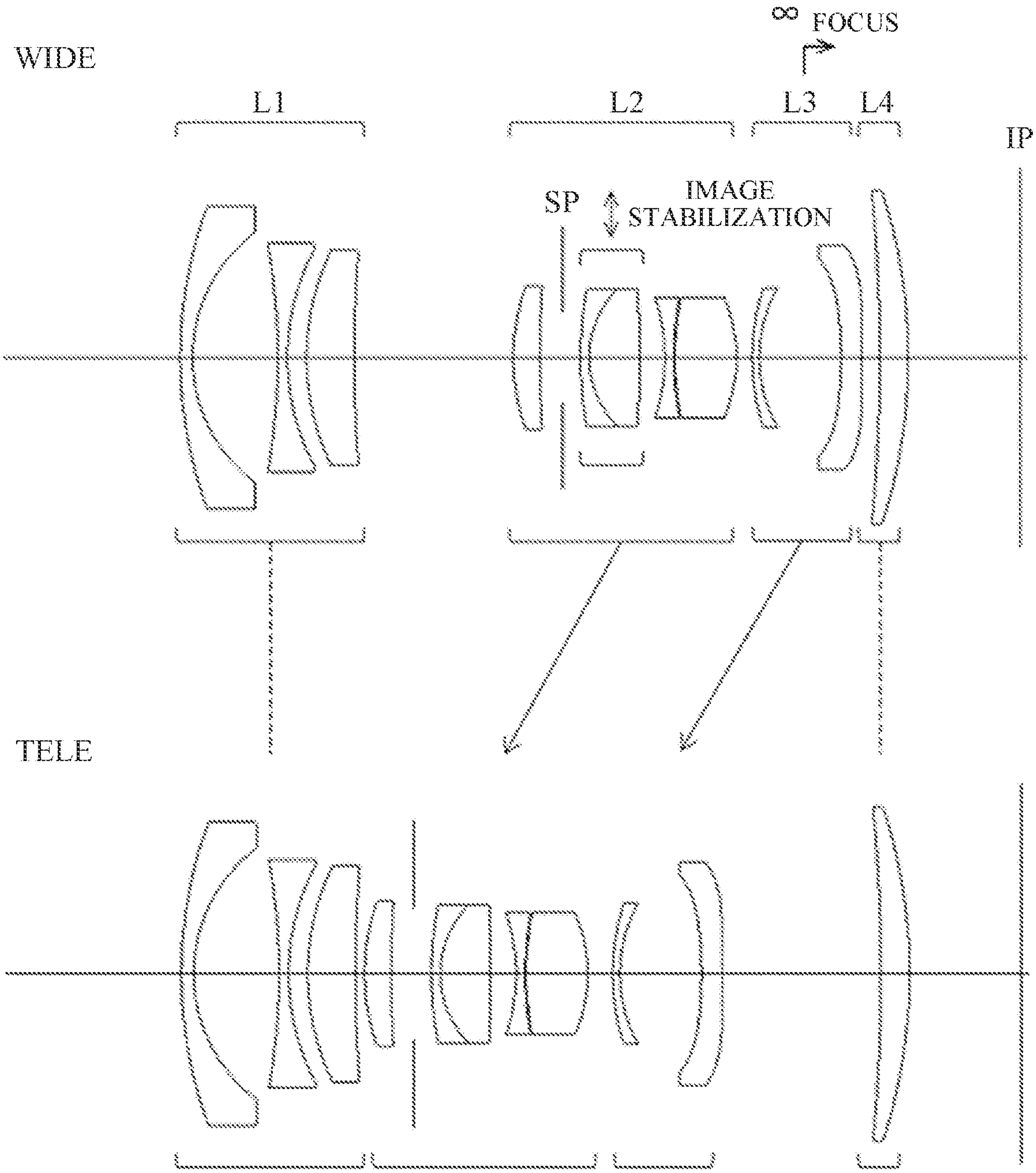
FIG. 13 is a lens sectional view in an in-focus state on the infinity object at a wide-angle end and a telephoto end according to Example 7.
Figure 14A:
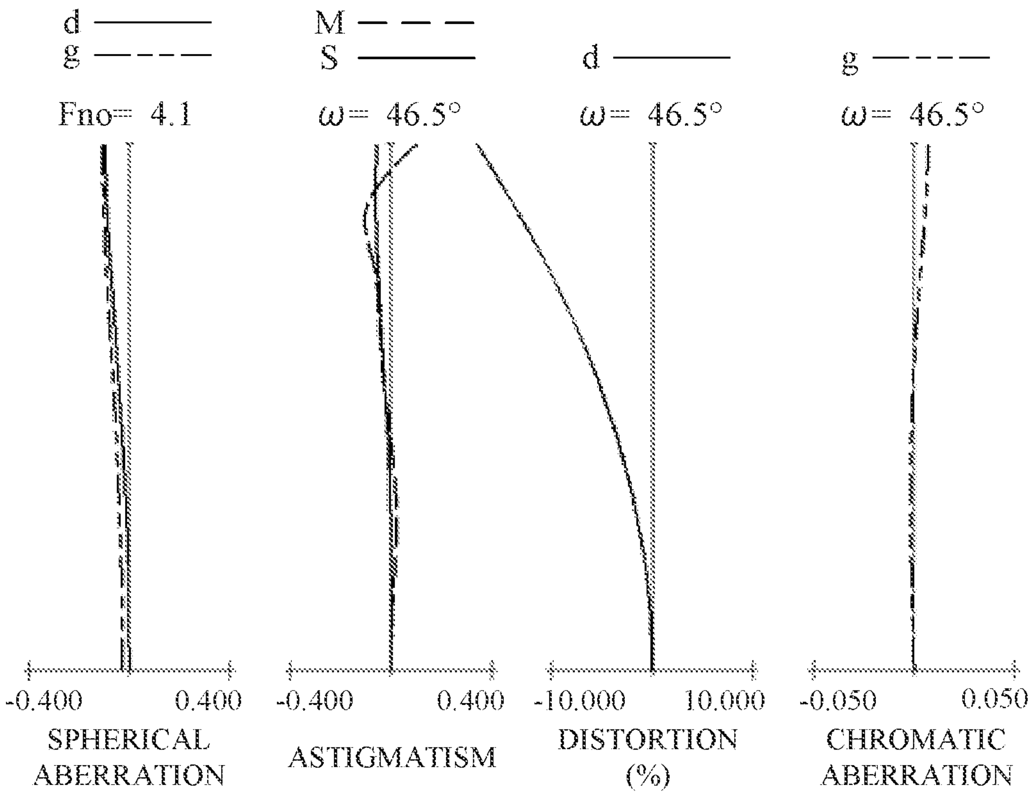
FIGS. 14A and 14B are longitudinal aberration diagrams in the in-focus state on the infinity object at the wide-angle end and telephoto end according to Example 7, respectively.
Figure 14B:
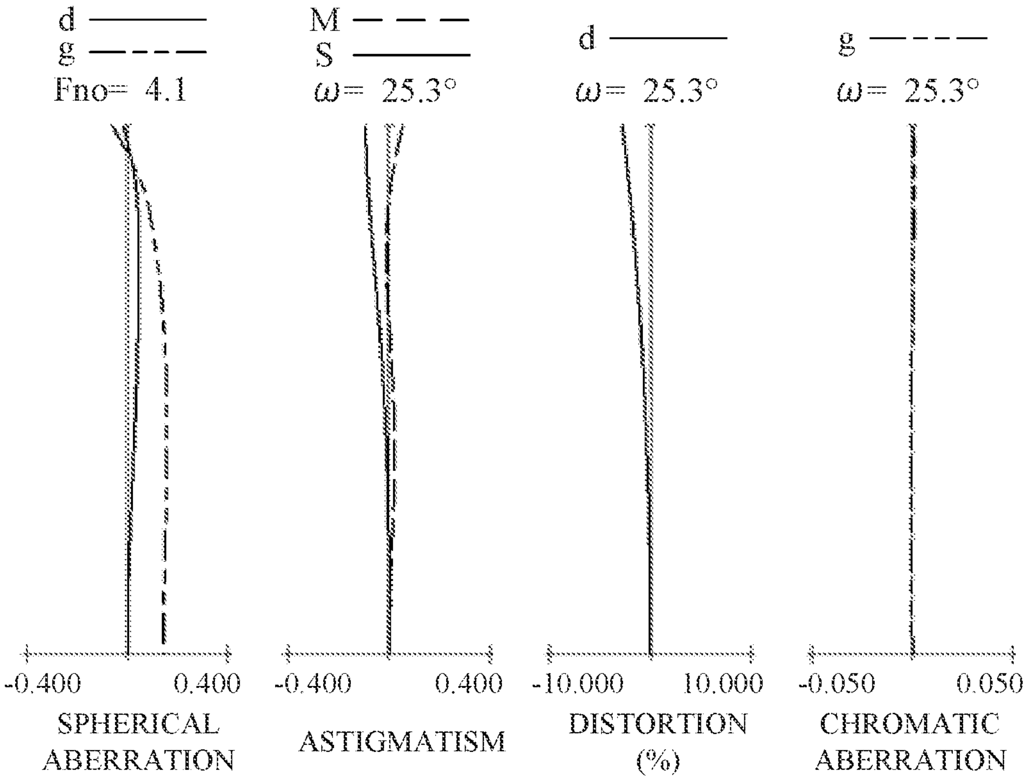
Figure 15:
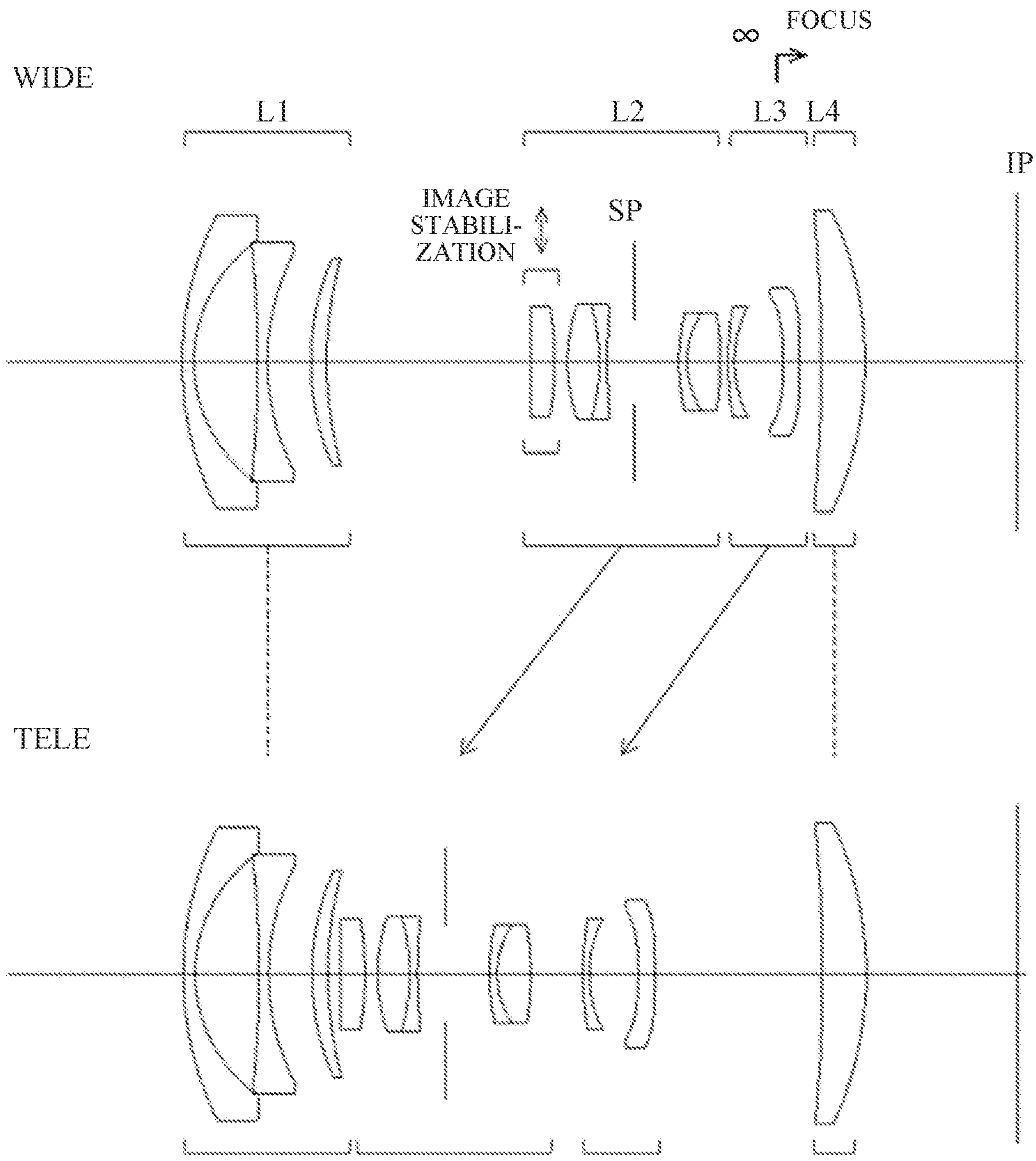
FIG. 15 is a lens sectional view in an in-focus state on the infinity object at a wide-angle end and a telephoto end according to Example 8.
Figure 16A:
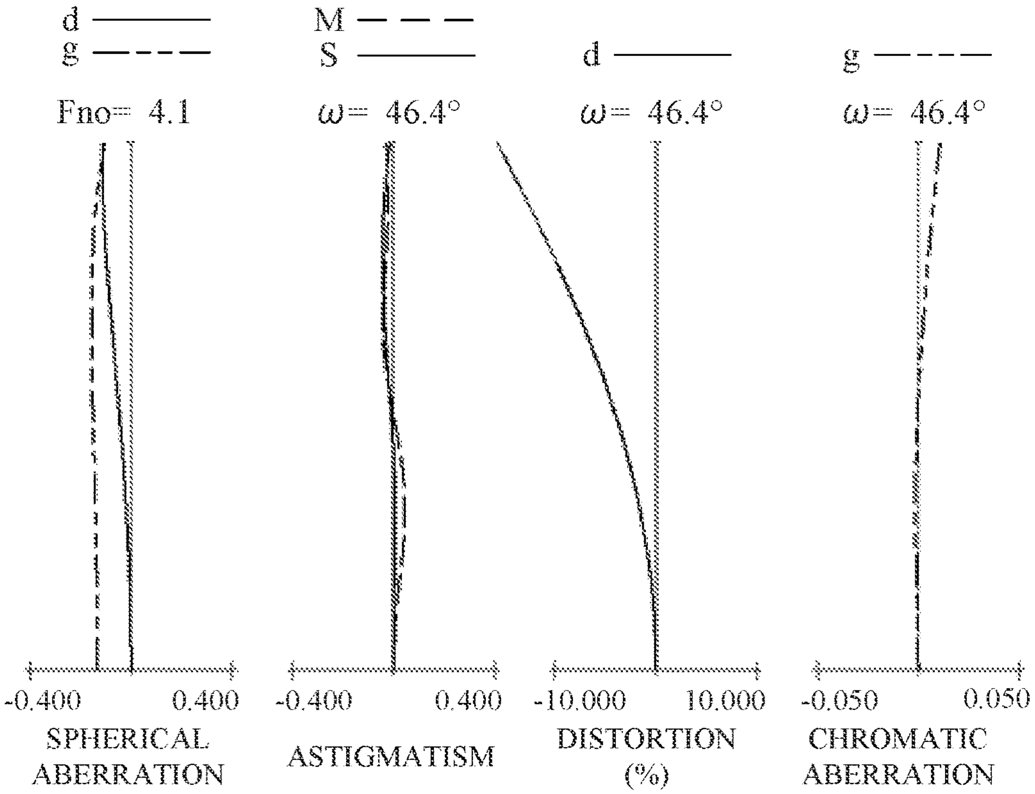
FIGS. 16A and 16B are longitudinal aberration diagrams in the in-focus state on the infinity object at the wide-angle end and telephoto end according to Example 8, respectively.
Figure 16B:
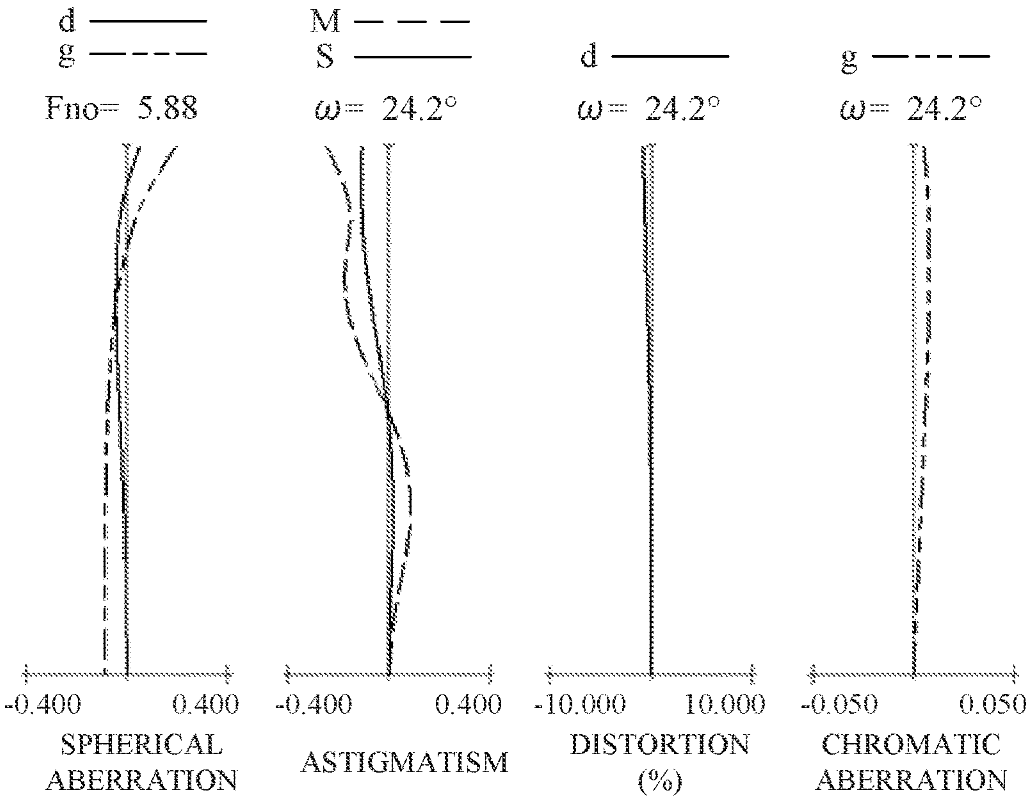
Figure 17:
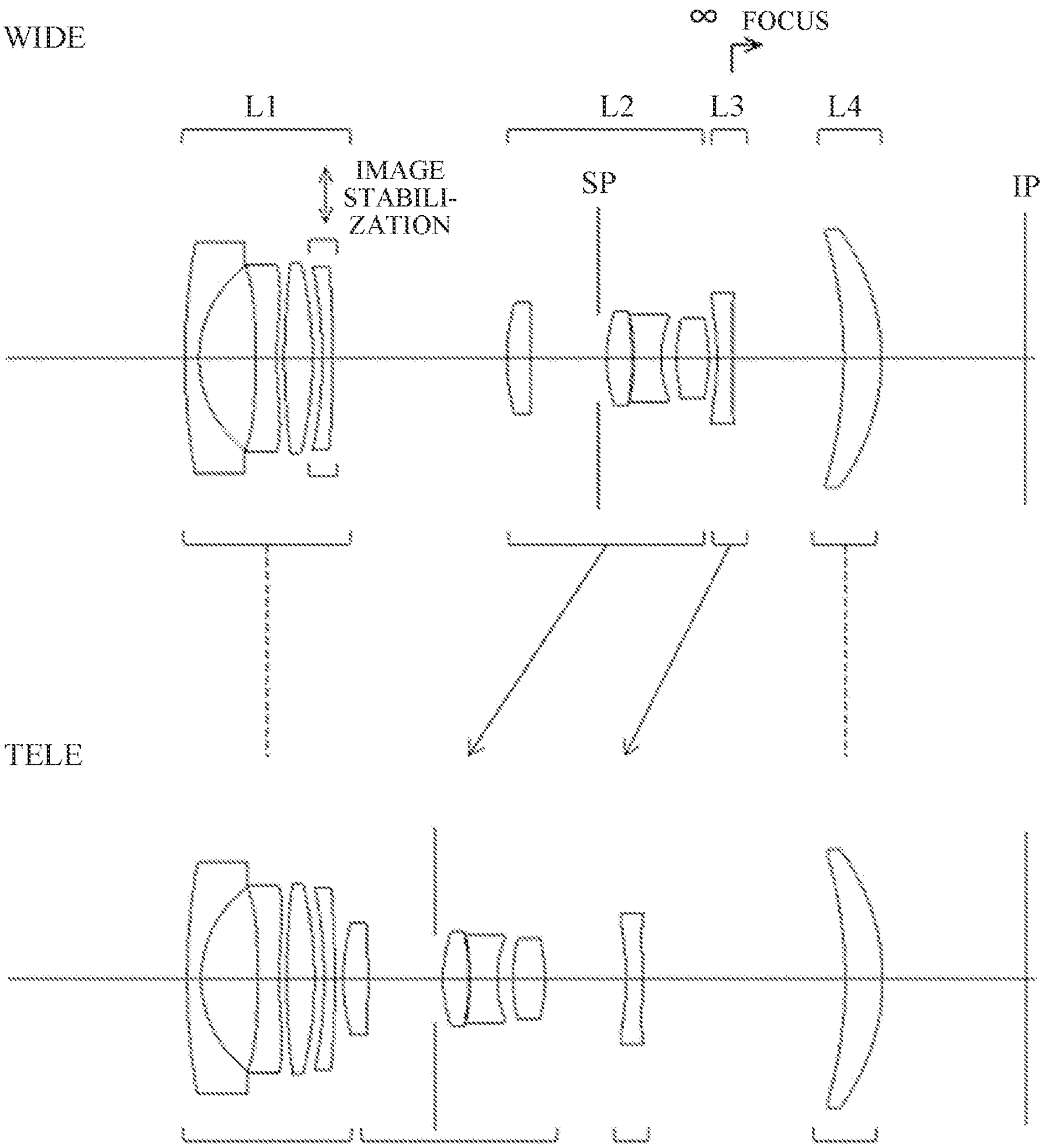
FIG. 17 is a lens sectional view in an in-focus state on the infinity object at a wide-angle end and a telephoto end according to Example 9.
Figure 18A:
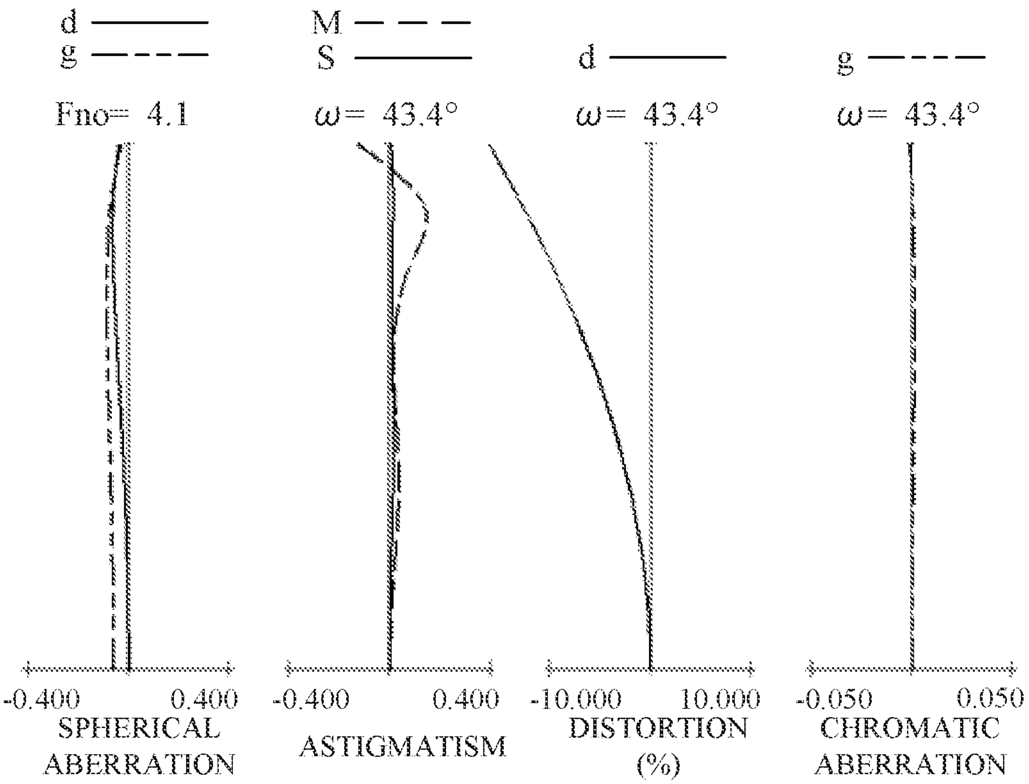
FIGS. 18A and 18B are longitudinal aberration diagrams in the in-focus state on the infinity object at the wide-angle end and telephoto end according to Example 9, respectively.
Figure 18B:
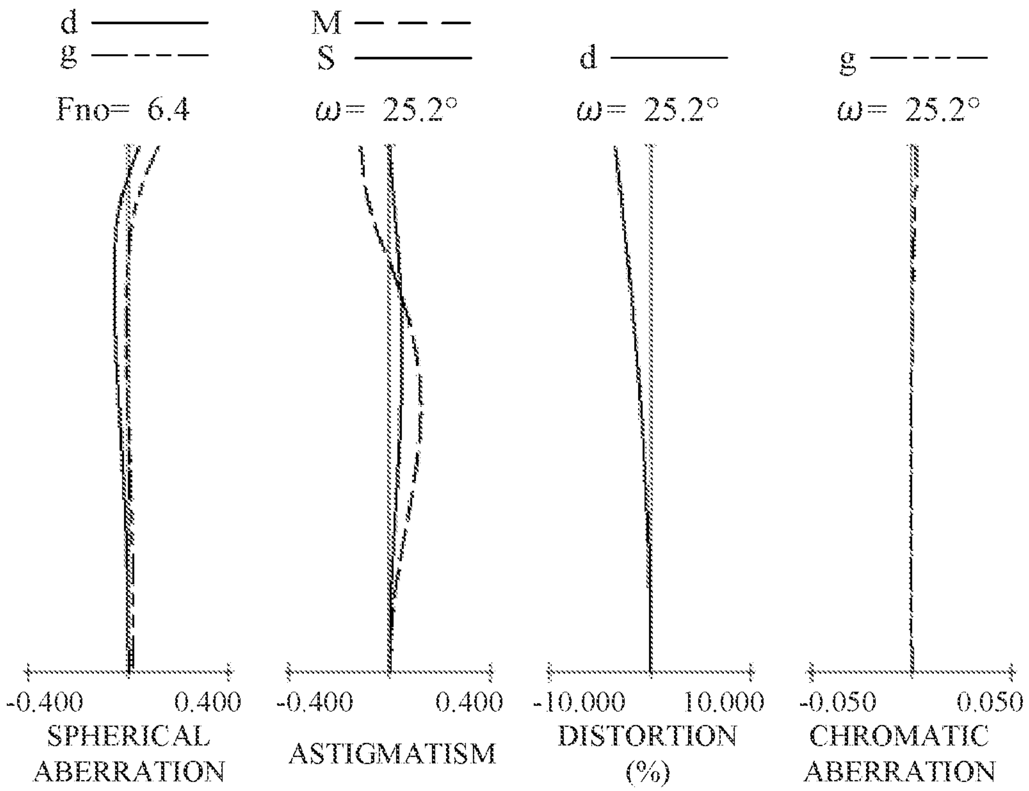
Figure 19:
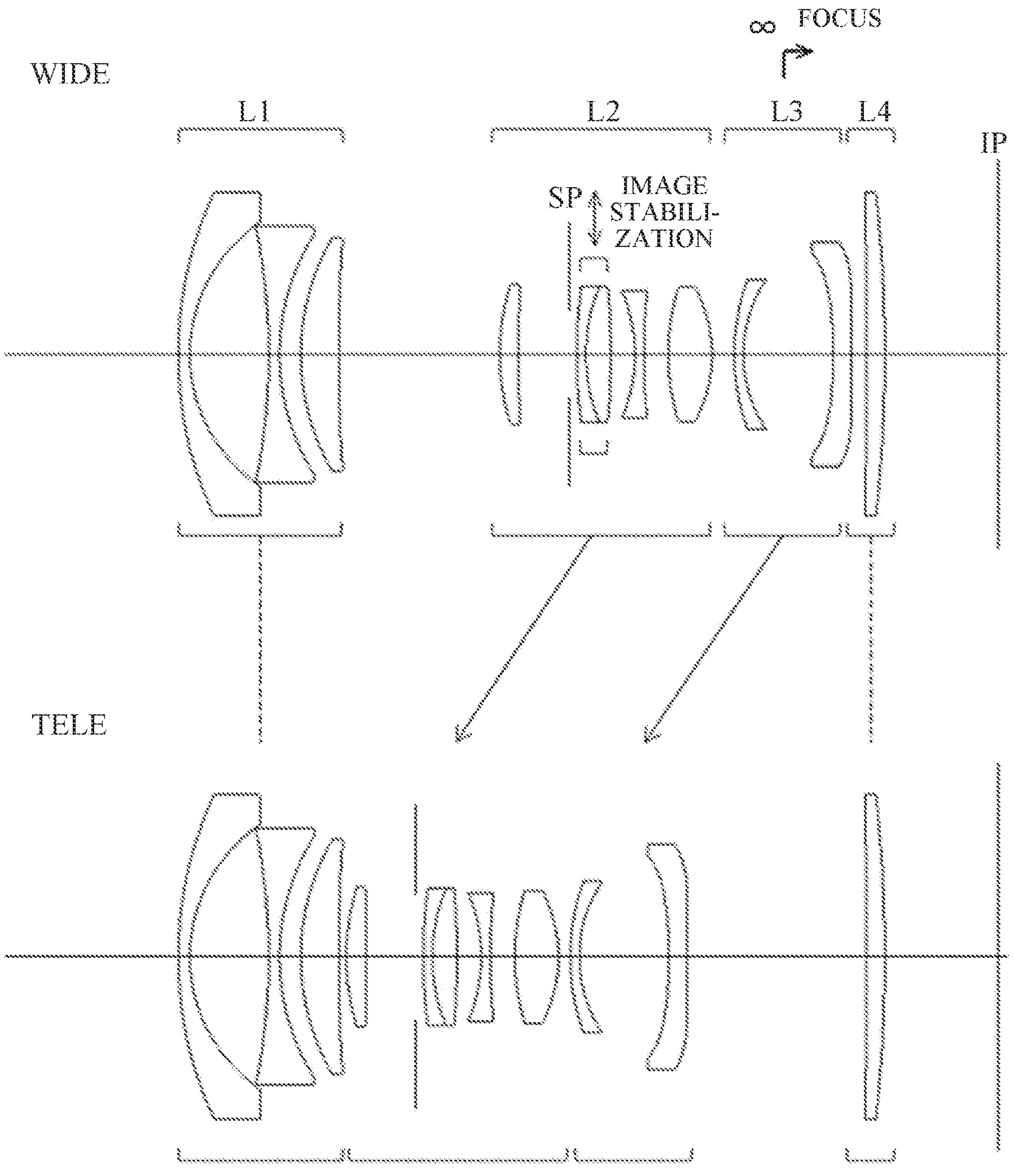
FIG. 19 is a lens sectional view in an in-focus state on the infinity object at a wide-angle end and a telephoto end according to Example 10.
Figure 20A:
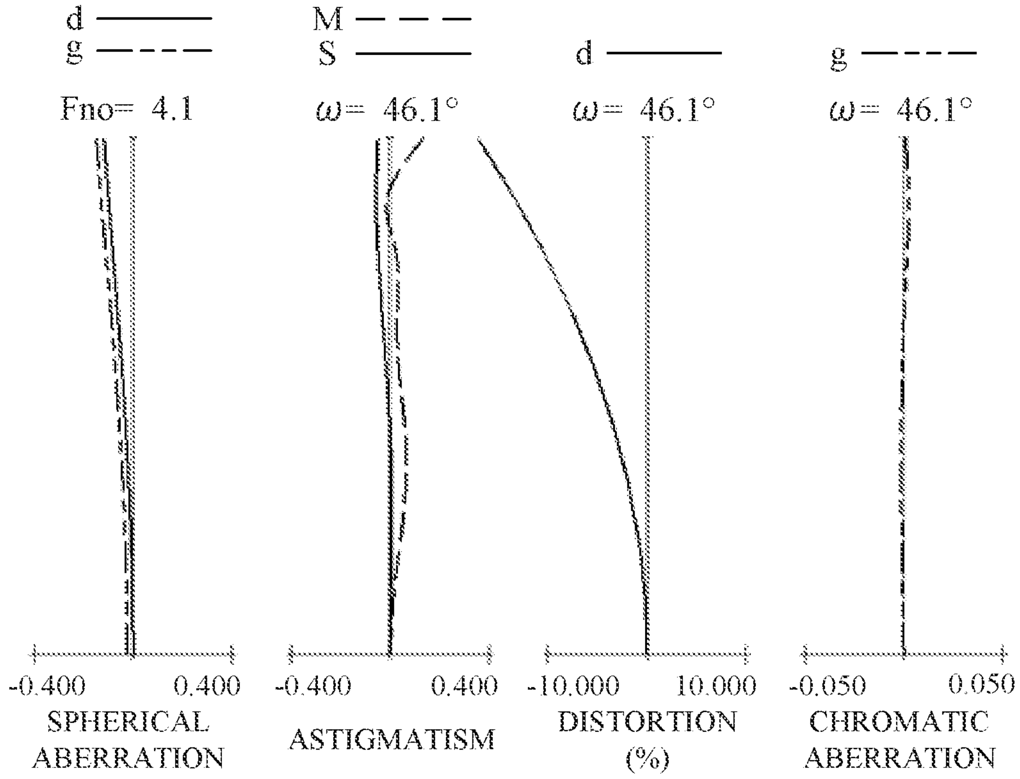
FIGS. 20A and 20B are longitudinal aberration diagrams in the in-focus state on the infinity object at the wide-angle end and telephoto end according to Example 10, respectively.
Figure 20B:
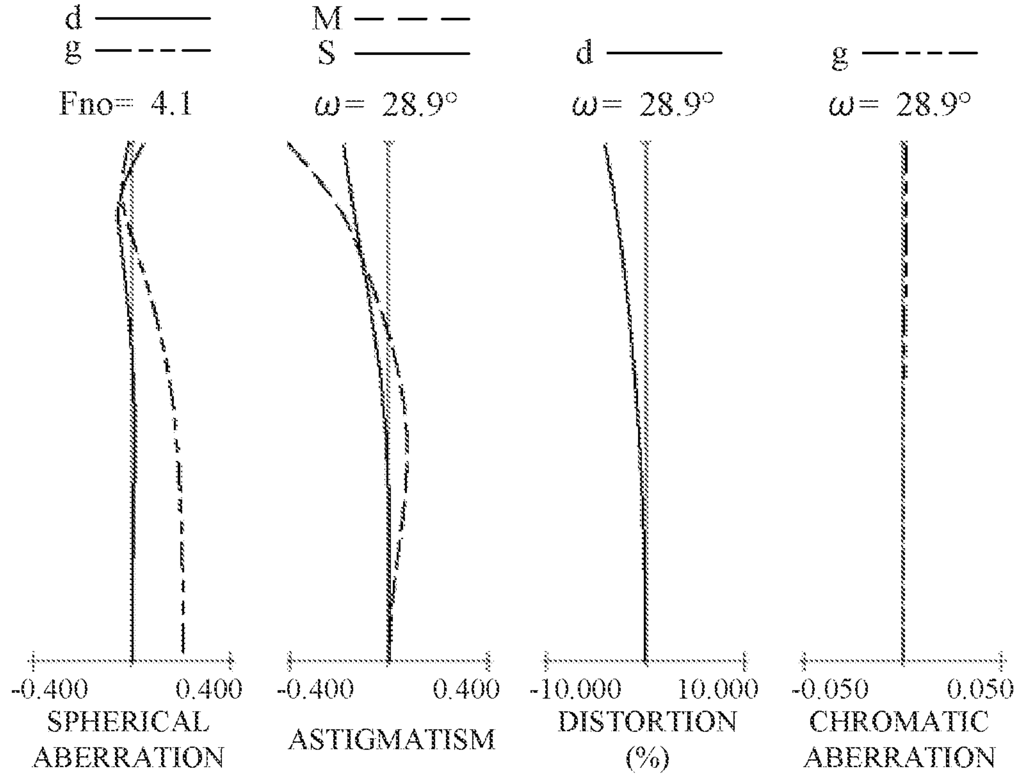
Figure 21:
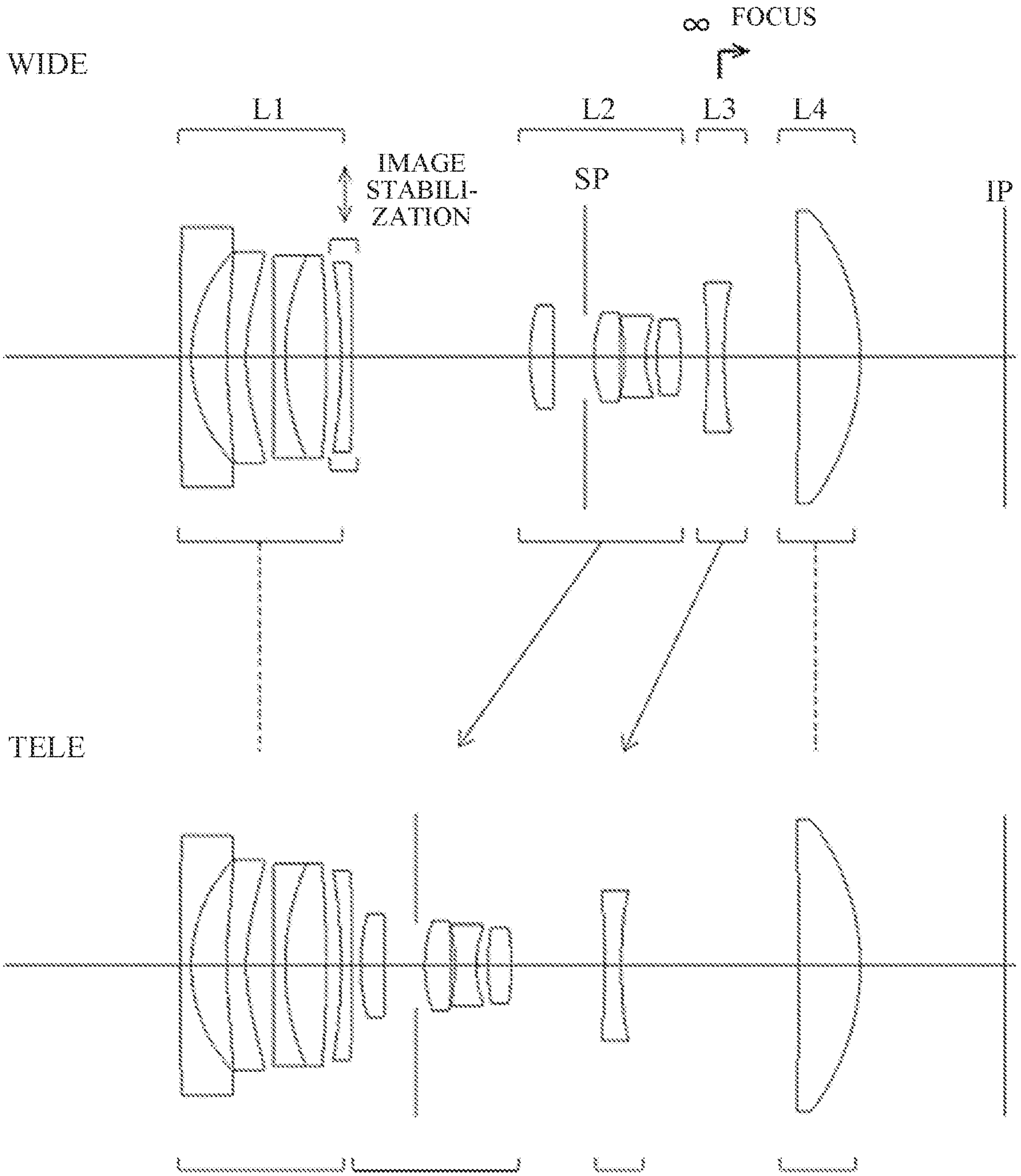
FIG. 21 is a lens sectional view in an in-focus state on the infinity object at a wide-angle end and a telephoto end according to Example 11.
Figure 22A:
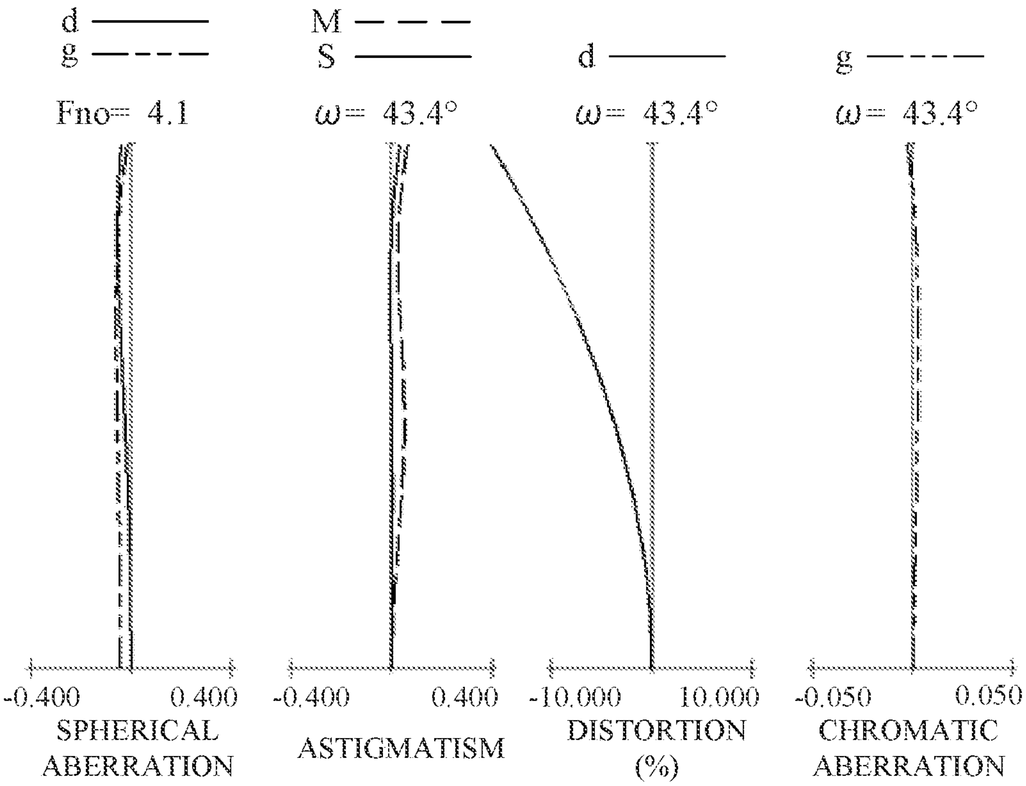
FIGS. 22A and 22B are longitudinal aberration diagrams in the in-focus state on the infinity object at the wide-angle end and telephoto end according to Example 11, respectively.
Figure 22B:
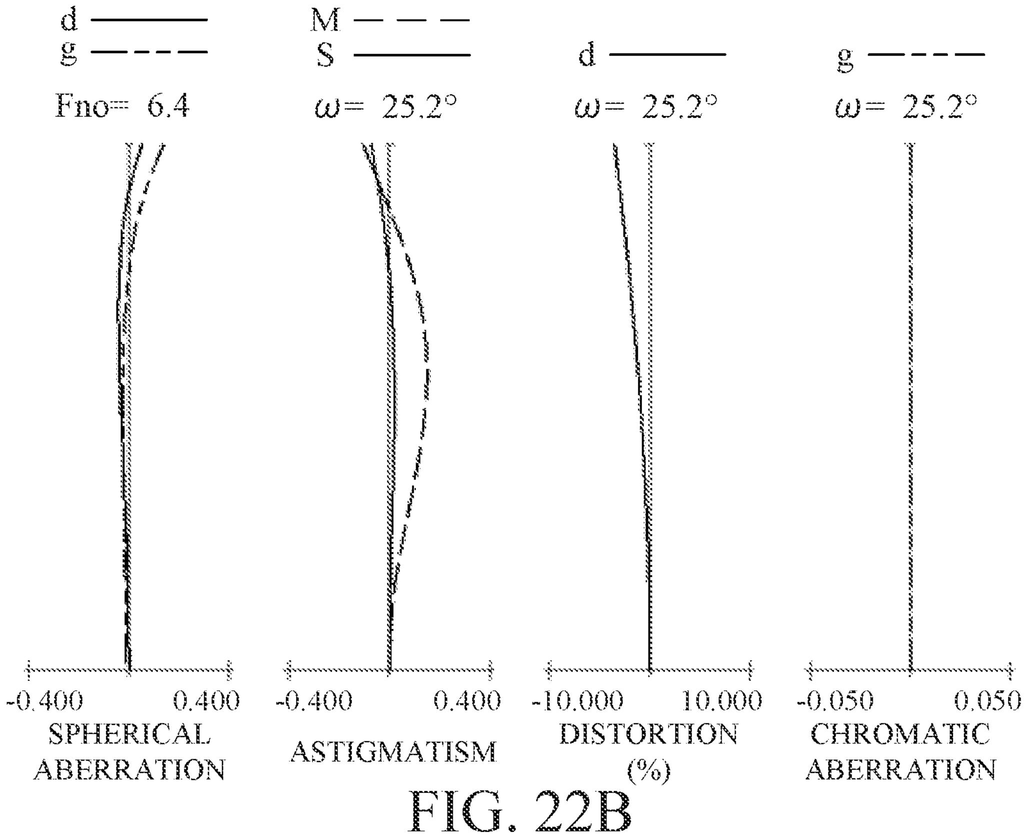
Figure 23:
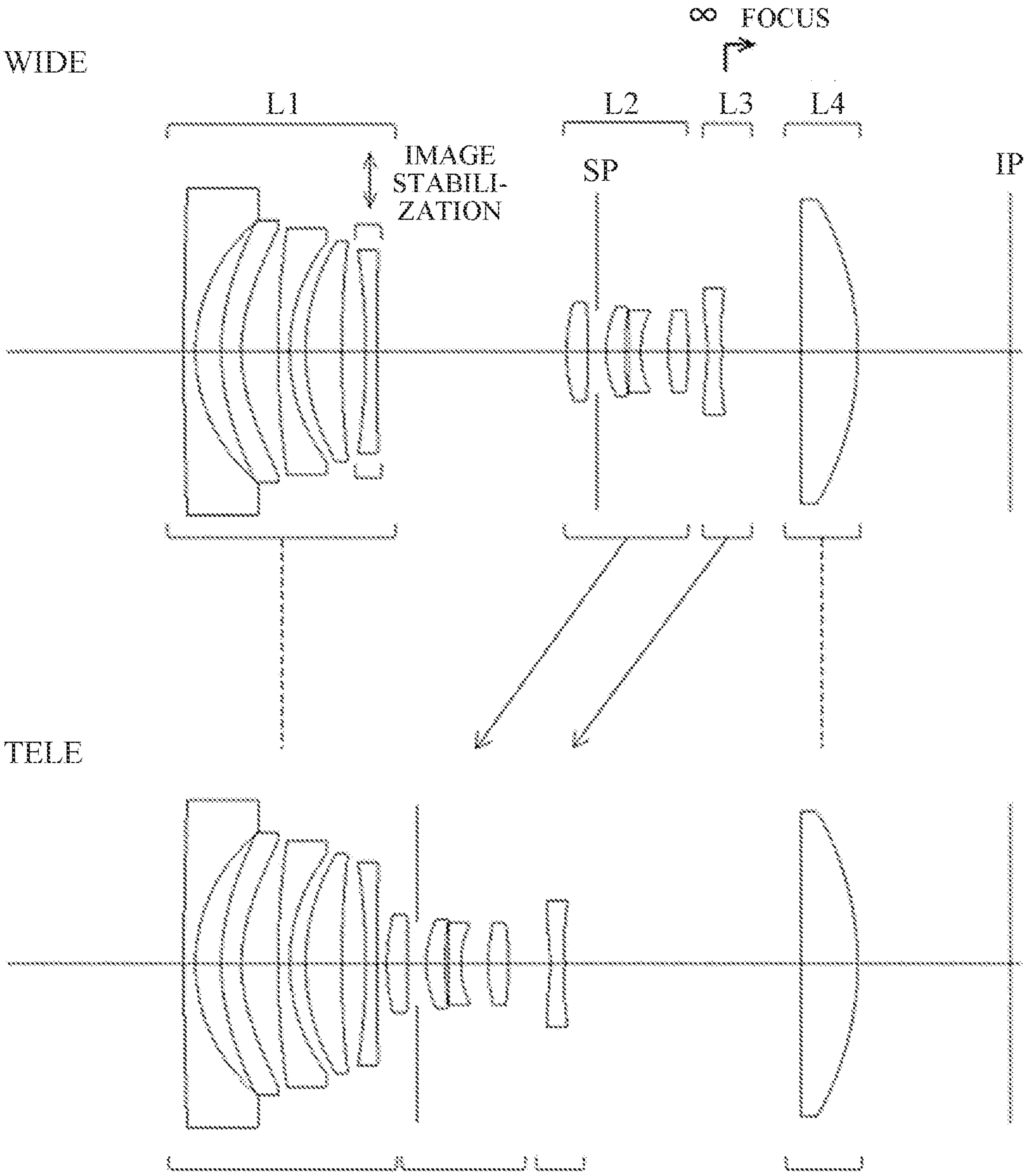
FIG. 23 is a lens sectional view in an in-focus state on the infinity object at a wide-angle end and a telephoto end according to Example 12.
Figure 24A:
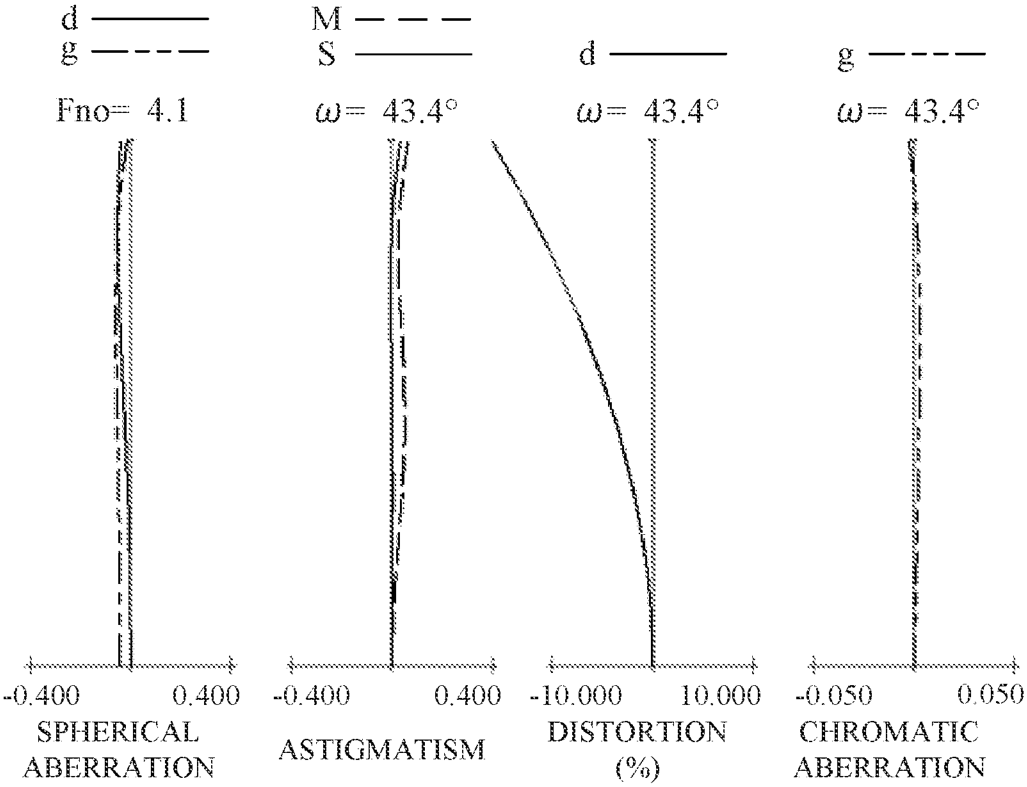
FIGS. 24A and 24B are longitudinal aberration diagrams in the in-focus state on the infinity object at the wide-angle end and telephoto end according to Example 12, respectively.
Figure 24B:
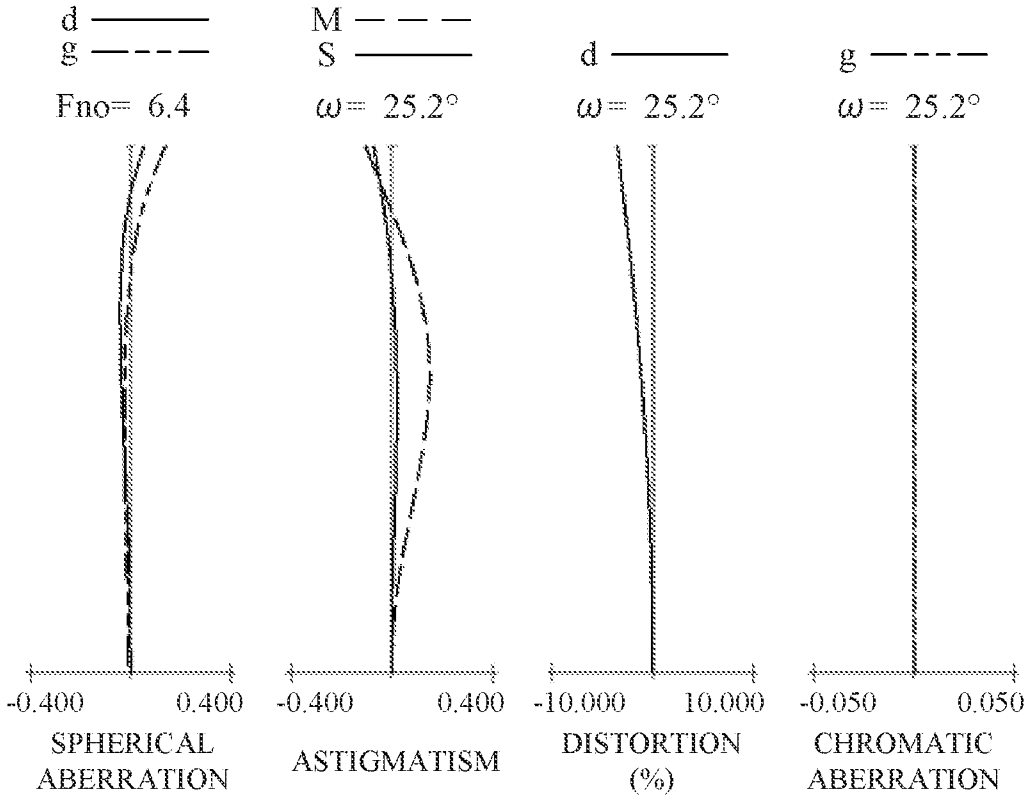
Figure 25:
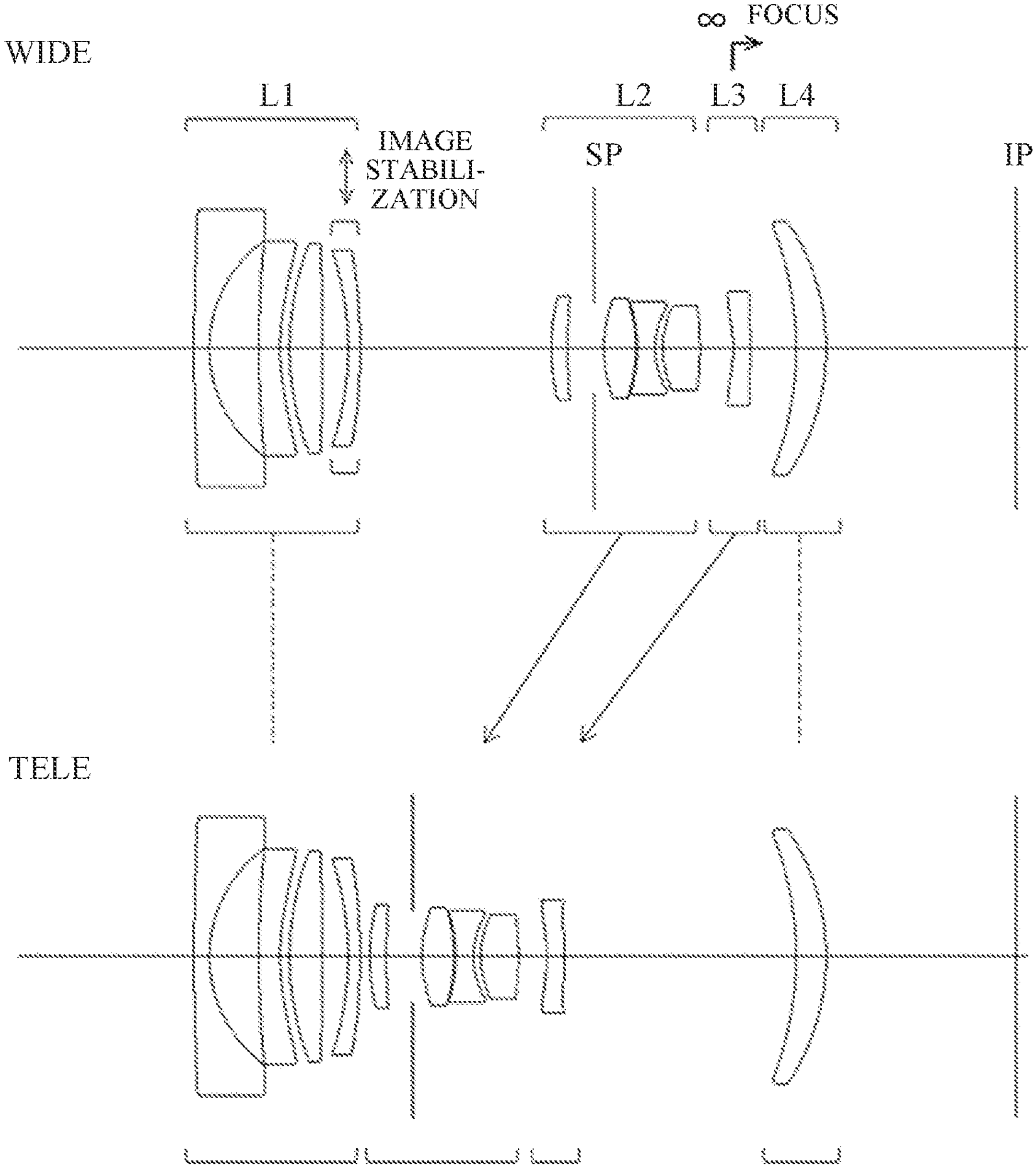
FIG. 25 is a lens sectional view in an in-focus state on the infinity object at a wide-angle end and a telephoto end according to Example 13.
Figure 26A:
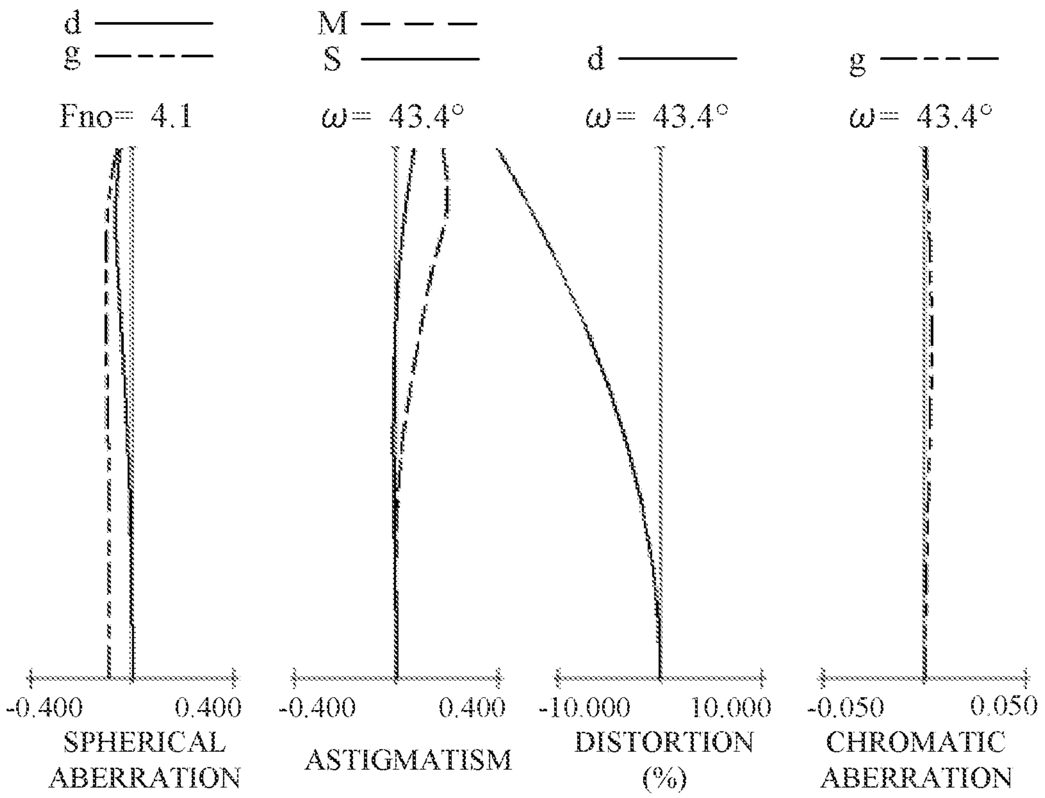
FIGS. 26A and 26B are longitudinal aberration diagrams in the in-focus state on the infinity object at the wide-angle end and telephoto end according to Example 13, respectively.
Figure 26B:
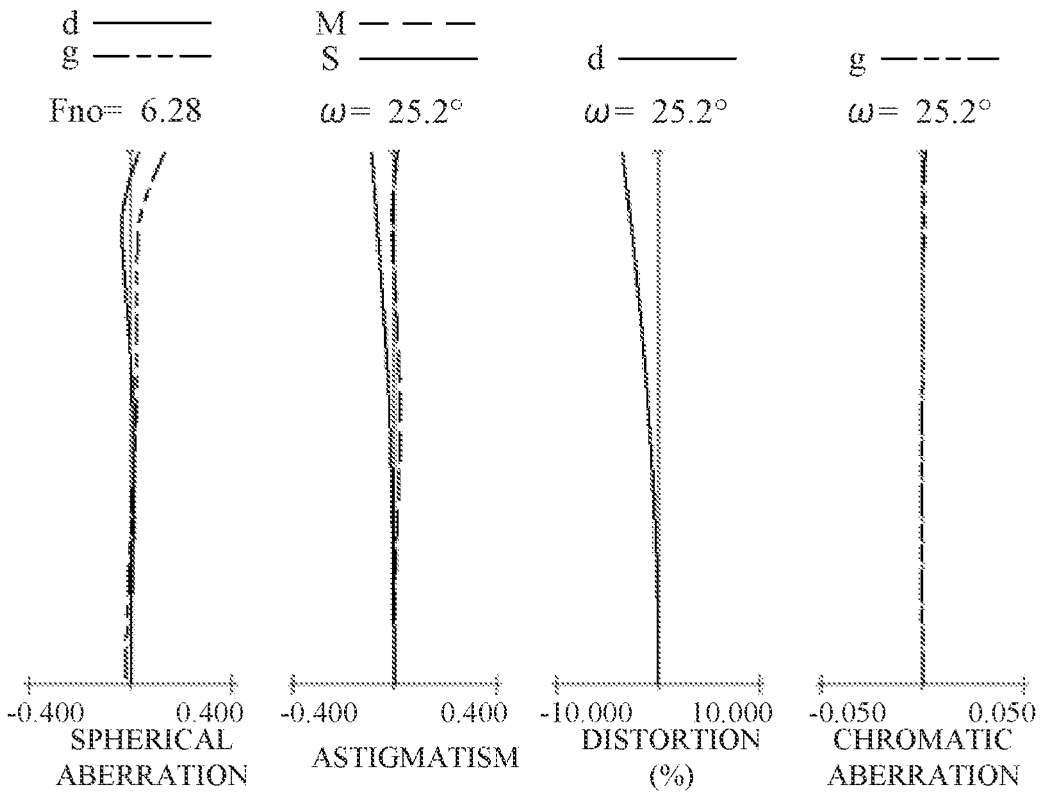

Referring now to the accompanying drawings, a description will be given of a zoom lens, an image pickup apparatus, and an image pickup system according to the disclosure.

FIGS. 1, 3, 5, 7, 9, 11, 13, 15, 17, 19, 21, 23, and 25 are lens sectional views of zoom lenses according to Examples 1 to 13, respectively, in in-focus states at infinity at a wide-angle end (WIDE) and a telephoto end (TELE). The zoom lens according to each example may be a zoom lens for an image pickup apparatus such as a digital still camera, a film-based camera, a digital video camera, a surveillance camera, a broadcasting camera, and an on-board camera.

In each lens sectional view, a left side is an object side (front) and a right side is an image side (back). The zoom lens according to each example includes a plurality of lens units. In this specification, a lens unit may be a group of lenses that move or stand still during zooming. That is, in the zoom lens according to each example, a distance between adjacent lens units changes during zooming from the wide-angle end to the telephoto end. Each lens unit may include one or more lenses. The lens unit may include an aperture stop.

In each lens sectional view, Li represents an i-th (where i is a natural number) lens unit counted from the object side in the zoom lens.

SP denotes the aperture stop. The aperture stop SP determines (limits) a light beam of the maximum aperture F-number (Fno). IP denotes an image plane, and in a case where the zoom lens according to each example is used as an imaging optical system of a digital still camera or video camera, the imaging plane of a solid-state image sensor (photoelectric conversion element) such as a CCD sensor or CMOS sensor is disposed on the image plane IP. In a case where the zoom lens according to any example is used as an imaging optical system of a film-based camera, a photosensitive plane corresponding to the film plane is placed on the image plane IP.

An arrow in the optical axis direction indicates a moving direction of the focus lens unit during focusing from infinity to a close (or short) distance. A solid arrow illustrated below each lens unit indicates a moving locus of each lens unit during zooming from the wide-angle end to the telephoto end. A vertical broken line below each lens unit indicates that each lens unit is fixed relative to the image plane during zooming from the wide-angle end to the telephoto end. A bidirectional arrow in a direction orthogonal to the optical axis indicates movement of a lens unit during image stabilization.

In each of the following examples, the wide-angle end and the telephoto end refer to zoom positions in a case where the lens unit for zooming is mechanically located at both ends of the movable range on the optical axis.

FIGS. 2A, 2B, 4A, 4B, 6A, 6B, 8A, 8B, 10A, 10B, 12A, 12B, 14A, 14B, 16A, 16B, 18A, 18B, 20A, 20B, 22A, 22B, 24A, 24B, 26A, and 26B illustrate zoom lenses according to Examples 1 to 13, respectively. FIGS. 2A, 4A, 6A, 8A, 10A, 12A, 14A, 16A, 18A, 20A, 22A, 24A, and 26A are aberration diagrams at the wide-angle end, and FIGS. 2B, 4B, 6B, 8B, 10B, 12B, 14B, 16B, 18B, 20B, 22B, 24B, and 26B are aberration diagrams at the telephoto end.

In a spherical aberration diagram, Fno denotes an F-number. The spherical aberration diagram illustrates spherical aberration amounts for the d-line (wavelength 587.6 nm) and g-line (wavelength 435.8 nm). In an astigmatism diagram, S indicates an astigmatism amount on a sagittal image plane, and M indicates an astigmatism amount on a meridional image plane. A distortion diagram illustrates a distortion amount for the d-line. A chromatic aberration diagram illustrates a chromatic aberration amount for the g-line. ω denotes a half angle of view (°) (angle of view in paraxial calculation) and indicates the angle of view according to a ray tracing value.

A description will now be given of the characteristic configuration of the zoom lens according to each example.

The zoom lens according to each example includes a plurality of lens units that consist of, in order from the object side to the image side, a first lens unit L1 having negative refractive power, a second lens unit L2 having positive refractive power, a third lens unit L3 having negative refractive power, and a fourth lens unit L4 having positive refractive power. In the zoom lens according to each example, a distance between adjacent lens units changes during zooming from the wide-angle end to the telephoto end.

The first lens unit L1 includes three or more lenses. During zooming from the wide-angle end to the telephoto end, the first lens unit L1 is fixed relative to the image plane IP.

The zoom lens according to each example satisfies the following inequalities (1) to (3), where f1 is a focal length of the first lens unit L1, f2 is a focal length of the second lens unit L2, f4 is a focal length of the fourth lens unit L4. LD1 is a distance on the optical axis from a lens surface on the object side of a lens closest to the object in the first lens unit L1 to a lens surface on the image side of a lens closest to the image plane in the first lens unit L1. In the zoom lens at the wide-angle end, TTL is a distance on the optical axis from the lens surface on the object side of the lens closest to the object to the image plane IP (overall length obtained by removing a parallel plate such as a filter) (overall lens length).

$$0.85<(-f1)/f2<2.00 \tag{1}$$

$$0.00<(-f1)/f4<0.55 \tag{2}$$

$$0.00<LD1/TTL<0.27 \tag{3}$$

Inequality (1) is an inequality that defines a ratio between the focal length f1 of the first lens unit L1 and the focal length f2 of the second lens unit L2. In a case where the refractive power of the second lens unit L2 becomes stronger and the value of (−f1)/f2 becomes higher than the upper limit of inequality (1), it becomes difficult to correct aberrations. In a case where the refractive power of the second lens unit L2 becomes weaker and the value of (−f1)/f2 becomes lower than the lower limit of inequality (1), the moving amount of the second lens unit L2 increases during zooming, and the zoom lens becomes larger.

Inequality (2) is an inequality that defines a ratio between the focal length f1 of the first lens unit L1 and the focal length f4 of the fourth lens unit L4. Satisfying inequality (2) can reduce the size of the zoom lens while telecentricity is maintained. In a case where the refractive power of the fourth lens unit L4 increases and the value of (−f1)/f4 becomes higher than the upper limit of inequality (2), the telecentricity improves but the zoom lens becomes larger. The value of (−f1)/f4 cannot become lower than the lower limit of inequality (2).

Inequality (3) is an inequality that defines a distance LD1 on the optical axis from the lens surface on the object side of the lens closest to the object in the first lens unit L1 to the lens surface on the image side of the lens closest to the image plane in the first lens unit L1 and the overall lens length TTL of the zoom lens at the wide-angle end. Satisfying inequality (3) can reduce the weight of the zoom lens. In a case where the value of LD1/TTL becomes higher than the upper limit of inequality (3), the distance LD1 becomes too large, and the first lens unit L1 becomes larger. The value of LD1/TTL cannot become lower than the lower limit of inequality (3).

Inequalities (1) to (3) may be replaced with the following inequalities (1a) to (3a):

$$0.88<(-f1)/f2<1.70 \quad (1a)$$

$$0.09<(-f1)/f4<0.52 \quad (2a)$$

$$0.07<LD1/TTL<0.25 \quad (3a)$$

Inequalities (1) to (3) may be replaced with the following inequalities (1b) to (3b):

$$0.89<(-f1)/f2<1.41 \quad (1b)$$

$$0.16<(-f1)/f4<0.50 \quad (2b)$$

$$0.13<LD1/TTL<0.24 \quad (3b)$$

As described above, the zoom lens according to each example is configured to satisfy inequalities (1) to (3). Thereby, each example can provide a negative lead type wide-angle zoom lens that is compact and lightweight yet has high optical performance over the entire zoom range.

A description will now be given of the configuration that may be satisfied by the zoom lens according to each example.

In the zoom lens according to each example, the first lens unit L1 may consist of lenses having refractive powers. Thereby, the aberration generated in the first lens unit L1 can be satisfactorily corrected, which is beneficial in miniaturization of the zoom lens.

In the zoom lens according to each example, the second lens unit L2 may include an aperture stop SP. The third lens unit L3 may be a focus lens unit that moves during focusing. The third lens unit may consist of a single negative fixed focal length lens or two negative fixed focal length lenses. Thereby, high optical performance can be achieved over focusing from a short-distance object to a long-distance object.

A description will be given of inequalities that the zoom lens according to each example may satisfy. The zoom lens according to each example may satisfy one or more of the following inequalities (4) to (17).

Here, BFw is an air conversion amount of a distance on the optical axis from the lens surface on the image side of the lens closest to the image plane IP to the image plane IP in the zoom lens at the wide-angle end in an in-focus state on the infinity object (distance obtained by removing a parallel plate, such as a filter) (back focus). fw is a focal length of the zoom lens at the wide-angle end. f3 is a focal length of the third lens unit L3. ft is a focal length of the zoom lens at the telephoto end. β2t is lateral magnification of the second lens unit L2 at the telephoto end in the in-focus state on the infinity object. β2w is lateral magnification of the second lens unit L2 at the wide-angle end in the in-focus state on the infinity object. β3t is lateral magnification of the third lens unit L3 at the telephoto end in the in-focus state on the infinity object. β3w is lateral magnification of the third lens unit L3 at the wide-angle end in the in-focus state on the infinity object. fn1 is a focal length of the first negative lens in the first lens unit L1. fn2 is a focal length of the second negative lens in the first lens unit L1. fp1 is a focal length of the first positive lens in the first lens unit L1.

$$0.30<BFw/(-f1)<1.50 \quad (4)$$

$$0.07<BFw/TTL<0.30 \quad (5)$$

$$2.0<TTL/(-f1)<6.0 \quad (6)$$

$$3.0<TTL/fw<7.5 \quad (7)$$

$$0.1<f2/(-f3)<1.5 \quad (8)$$

$$0.05<f2/f4<0.80 \quad (9)$$

$$0.1<(-f3)/f4<2.0 \quad (10)$$

$$0.5<(-f1)/fw<2.5 \quad (11)$$

$$0.2<(-f1)/ft<1.4 \quad (12)$$

$$0.5<\beta2t/\beta2w<3.0 \quad (13)$$

$$0.5<\beta3t/\beta3w<2.0 \quad (14)$$

$$0.5<fn1/f1<2.0 \quad (15)$$

$$0.5<fn2/f1<10.0 \quad (16)$$

$$0.5<fp1/(-f1)<5.0 \quad (17)$$

Inequality (4) is an inequality that defines a ratio between the back focus BFw of the zoom lens at the wide-angle end in the in-focus state on the infinity object and the focal length f1 of the first lens unit L1. In a case where the refractive power of the first lens unit L1 becomes stronger and the value of BFw/(−f1) becomes higher than the upper limit of inequality (4), aberration correction becomes difficult. In a case where the refractive power of the first lens unit L1 becomes weaker and the value of BFw/(−f1) becomes lower than the lower limit of inequality (4), the zoom lens becomes larger.

Inequality (5) is an inequality that defines a ratio between the back focus BFw of the zoom lens at the wide-angle end in the in-focus state on the infinity object and the overall lens length TTL of the zoom lens at the wide-angle end. Satisfying inequality (5) can reduce the size of the zoom lens while telecentricity is maintained. In a case where the value of BFw/TTL becomes higher than the upper limit of inequality (5), the zoom lens becomes larger. In a case where the value of BFw/TTL becomes lower than the lower limit of inequality (5), the back focus BFw becomes too short, and it becomes difficult to maintain telecentricity.

Inequality (6) is an inequality that defines a ratio between the overall lens length TTL of the zoom lens at the wide-angle end and the focal length f1 of the first lens unit L1. In a case where the refractive power of the first lens unit L1 becomes stronger and the value of TTL/(−f1) becomes higher than the upper limit of inequality (6), aberration correction becomes difficult. In a case where the refractive power of the first lens unit L1 becomes weaker and the value of TTL/(−f1) becomes lower than the lower limit of inequality (6), the zoom lens becomes larger.

Inequality (7) is an inequality that defines a ratio between the overall lens length TTL of the zoom lens at the wide-angle end and the focal length fw of the zoom lens at the wide-angle end. In a case where the value of TTL/fw becomes higher than the upper limit of inequality (7), the zoom lens becomes larger. In a case where the value of TTL/fw becomes lower than the lower limit of inequality (7), aberration correction becomes difficult.

Inequality (8) is an inequality that defines a ratio between the focal length f2 of the second lens unit L2 and the focal length f3 of the third lens unit L3. In a case where the refractive power of the second lens unit L2 becomes weaker and the value of f2/(−f3) becomes higher than the upper limit of inequality (8), the zoom lens becomes larger. In a case where the refracting power of the second lens unit L2 becomes stronger and the value of f2/(−f3) becomes lower than the lower limit of inequality (8), aberration correction becomes difficult.

Inequality (9) is an inequality that defines a ratio between the focal length f2 of the second lens unit L2 and the focal length f4 of the fourth lens unit L4. In a case where the refractive power of the second lens unit L2 becomes weaker and the value of f2/f4 becomes higher than the upper limit of inequality (9), the zoom lens becomes larger. In a case where the refracting power of the second lens unit L2 becomes stronger and the value of f2/f4 becomes lower than the lower limit of inequality (9), aberration correction becomes difficult.

Inequality (10) is an inequality that defines a ratio between the focal length f3 of the third lens unit L3 and the focal length f4 of the fourth lens unit L4. In a case where the refractive power of the third lens unit L3 becomes weaker and the value of (−f3)/f4 becomes higher than the upper limit of inequality (10), the zoom lens becomes larger. In a case where the refractive power of the third lens unit L3 becomes stronger and the value of (−f3)/f4 becomes lower than the lower limit of inequality (10), aberration correction becomes difficult.

Inequality (11) is an inequality that defines a ratio between the focal length f1 of the first lens unit L1 and the focal length fw of the zoom lens at the wide-angle end. In a case where the refractive power of the first lens unit L1 becomes weaker and the value of (−f1)/fw becomes higher than the upper limit of inequality (11), the zoom lens becomes larger. In a case where the refracting power of the first lens unit L1 becomes stronger and the value of (−f1)/fw becomes lower than the lower limit of inequality (11), aberration correction becomes difficult.

Inequality (12) is an inequality that defines a ratio between the focal length f1 of the first lens unit L1 and the focal length ft of the zoom lens at the telephoto end. In a case where the refractive power of the first lens unit L1 becomes weaker and the value of (−f1)/ft becomes higher than the upper limit of inequality (12), the zoom lens becomes larger. In a case where the refractive power of the first lens unit L1 becomes stronger and the value of (−f1)/ft becomes lower than the lower limit of inequality (12), aberration correction becomes difficult.

Inequality (13) is an inequality that defines a ratio between the lateral magnification β2t of the second lens unit L2 at the telephoto end in the in-focus state on the infinity object and the lateral magnification β2w of the second lens unit L2 at the wide-angle end in the in-focus state on the infinity object. In a case where inequality (13) is not satisfied, aberration correction becomes difficult over the entire zoom range.

Inequality (14) is an inequality that defines a ratio between the lateral magnification β3t of the third lens unit L3 at the telephoto end in the in-focus state on the infinity object and the lateral magnification β3w of the third lens unit L3 at the wide-angle end in the in-focus state on the infinity object. In a case where inequality (14) is not satisfied, aberration correction becomes difficult over the entire zoom range.

Inequality (15) is an inequality that defines a ratio between the focal length fn1 of the first negative lens, which is one of the lenses in the first lens unit L1, and the focal length f1 of the first lens unit L1. In a case where inequality (15) is not satisfied, aberration correction becomes difficult over the entire zoom range.

Inequality (16) is an inequality that defines a ratio between the focal length fn2 of the second negative lens, which is one of the lenses in the first lens unit L1, and the focal length f1 of the first lens unit L1. In a case where inequality (16) is not satisfied, aberration correction becomes difficult over the entire zoom range.

Inequality (17) is an inequality that defines a ratio between the focal length fp1 of the first positive lens, which is one of the lenses in the first lens unit L1, and the focal length f1 of the first lens unit L1. In a case where inequality (17) is not satisfied, aberration correction becomes difficult over the entire zoom range.

Inequalities (4) to (17) may be replaced with the following inequalities (4a) to (17a):

$$0.33<BFw/(-f1)<1.11 \quad (4a)$$

$$0.10<BFw/TTL<0.27 \quad (5a)$$

$$2.3<TTL/(-f1)<5.3 \quad (6a)$$

$$3.6<TTL/fw<7.1 \quad (7a)$$

$$0.17<f2/(-f3)<1.12 \quad (8a)$$

$$0.09<f2/f4<0.62 \quad (9a)$$

$$0.15<(-f3)/f4<1.68 \quad (10a)$$

$$0.89<(-f1)/fw<2.11 \quad (11a)$$

$$0.39<(-f1)/ft<1.13 \quad (12a)$$

$$1.0<\beta 2t/\beta 2w<2.45 \quad (13a)$$

$$0.8<\beta 3t/\beta 3w<1.63 \quad (14a)$$

$$0.60<fn1/f1<1.82 \quad (15a)$$

$$0.76<fn2/f1<8.22 \quad (16a)$$

$$0.72<fp1/(-f1)<4.16 \quad (17a)$$

Inequalities (4) to (17) may be replaced with the following inequalities (4b) to (17b):

$$0.37<BFw/(-f1)<0.75 \quad (4b)$$

$$0.12<BFw/TTL<0.24 \quad (5b)$$

$$2.7<TTL/(-f1)<4.7 \quad (6b)$$

$$4.3<TTL/fw<6.8 \quad (7b)$$

$$0.23<f2/(-f3)<0.76 \quad (8b)$$

$$0.11<f2/f4<0.45 \quad (9b)$$

$$0.17<(-f3)/f4<1.37 \quad (10b)$$

$$1.2<(-f1)/fw<1.9 \quad (11b)$$

$$0.58<(-f1)/ft<0.90 \quad (12b)$$

$$1.5<\beta 2t/\beta 2w<2.0 \quad (13b)$$

$$1.09<\beta 3t/\beta 3w<1.26 \quad (14b)$$

$$0.68<fn1/f1<1.65 \quad (15b)$$

$$1.0<fn2/f1<6.5 \quad (16b)$$

$$0.9<fp1/(-f1)<3.4 \quad (17b)$$

A detailed description will now be given of the zoom lens according to each example.

The zoom lens according to Example 1 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, a distance between adjacent lens units changes, and the first lens unit L1 and the fourth lens unit L4 are fixed relative to the image plane IP. During focusing, the third lens unit L3 moves. Image stabilization may be performed by moving a part of the first lens unit L1 in a direction including a component in a direction orthogonal to the optical axis.

The zoom lens according to Example 2 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, a distance between adjacent lens units changes, and the first lens unit L1 and the fourth lens unit L4 are fixed relative to the image plane IP. During focusing, the third lens unit L3 moves. Image stabilization may be performed by moving a part of the second lens unit L2 in a direction including a component in a direction orthogonal to the optical axis.

The zoom lens according to Example 3 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, a distance between adjacent lens units changes, and the first lens unit L1 and the fourth lens unit L4 are fixed relative to the image plane IP. During focusing, the third lens unit L3 moves. Image stabilization may be performed by moving a part of the second lens unit L2 in a direction including a component in a direction orthogonal to the optical axis.

The zoom lens according to Example 4 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, a distance between adjacent lens units changes, and the first lens unit L1 and the fourth lens unit L4 are fixed relative to the image plane IP. During focusing, the third lens unit L3 moves. Image stabilization may be performed by moving a part of the first lens unit L1 in a direction including a component in a direction orthogonal to the optical axis.

The zoom lens according to Example 5 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, a distance between adjacent lens units changes, and the first lens unit L1 and the fourth lens unit L4 are fixed relative to the image plane IP. During focusing, the third lens unit L3 moves. Image stabilization may be performed by moving a part of the second lens unit L2 in a direction including a component in a direction orthogonal to the optical axis.

The zoom lens according to Example 6 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, a distance between adjacent lens units changes, and the first lens unit L1 and the fourth lens unit L4 are fixed relative to the image plane IP. During focusing, the third lens unit L3 moves. Image stabilization may be performed by moving a part of the fourth lens unit L4 in a direction including a component in a direction orthogonal to the optical axis.

The zoom lens according to Example 7 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, a distance between adjacent lens units changes, and the first lens unit L1 and the fourth lens unit L4 are fixed relative to the image plane IP. During focusing, the third lens unit L3 moves. Image stabilization may be performed by moving a part of the second lens unit L2 in a direction including a component in a direction orthogonal to the optical axis.

The zoom lens according to Example 8 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, a distance between adjacent lens units changes, and the first lens unit L1 and the fourth lens unit L4 are fixed relative to the image plane IP. During focusing, the third lens unit L3 moves. Image stabilization may be performed by moving a part of the second lens unit L2 in a direction including a component in a direction orthogonal to the optical axis.

The zoom lens according to Example 9 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, a distance between adjacent lens units changes, and the first lens unit L1 and the fourth lens unit L4 are fixed relative to the image plane IP. During focusing, the third lens unit L3 moves. Image stabilization may be performed by moving a part of the first lens unit L1 in a direction including a component in a direction orthogonal to the optical axis.

The zoom lens according to Example 10 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, a distance between adjacent lens units changes, and the first lens unit L1 and the fourth lens unit L4 are fixed relative to the image plane IP. During focusing, the third lens unit L3 moves. Image stabilization may be performed by moving a part of the second lens unit L2 in a direction including a component in a direction orthogonal to the optical axis.

The zoom lens according to Example 11 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, a distance between adjacent lens units changes, and the first lens unit L1 and the fourth lens unit L4 are fixed relative to the image plane IP. During focusing, the third lens unit L3 moves. Image stabilization may be performed by moving a part of the first lens unit L1 in a direction including a component in a direction orthogonal to the optical axis.

The zoom lens according to Example 12 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, a distance between adjacent lens units changes, and the first lens unit L1 and the fourth lens unit L4 are fixed relative to the image plane IP. During focusing, the third lens unit L3 moves. Image stabilization may be performed by moving a part of the first lens unit L1 in a direction including a component in a direction orthogonal to the optical axis.

The zoom lens according to Example 13 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, a distance between adjacent lens units changes, and the first lens unit L1 and the fourth lens unit L4 are fixed relative to the image plane IP. During focusing, the third lens unit L3 moves. Image stabilization may be performed by moving a part of the first lens unit L1 in a direction including a component in a direction orthogonal to the optical axis.

Numerical Examples 1 to 13 corresponding to Examples 1 to 13 will be illustrated below.

In surface data of each numerical example, r represent a radius of curvature of each optical surface, and d (mm) represents an on-axis distance (distance on the optical axis) between an m-th surface and an (m+1)-th surface, where m is a surface number counted from the light incident side. nd represents a refractive index for the d-line of each optical element, and νd represents an Abbe number of the optical element based on the d-line. The Abbe number νd of a certain material is expressed as follows:

$$\nu d=(Nd-1)/(NF-NC)$$

where Nd, NF, and NC are refractive indices based on the d-line (587.6 nm), the F-line (486.1 nm), and the C-line (656.3 nm) in the Fraunhofer line, respectively.

In each numerical example, values of d, a focal length (mm), an F-number, and a half angle of view (°) are set in a case where the optical system according to each example is in the in-focus state on the infinity object. A back focus BF is a distance on the optical axis from the final lens surface (lens surface closest to the image plane) of the zoom lens L0 to the paraxial image plane expressed in air conversion length. The overall lens length of the zoom lens L0 is a length obtained by adding the back focus to a distance on the optical axis from the first lens surface (lens surface closest to the object) to the final lens surface. The lens unit includes one or more lenses.

In a case where the optical surface is aspherical, an asterisk * is attached to the right side of the surface number. The aspherical shape is expressed as follows:

$$X=(h^2/R)/[1+\{1-(1+K)(h/R)^2\}^{1/2}]+A4\times h^4+A6\times h^6+A8\times h^8+A10\times h^{10}+A12\times h^{12}$$

where X is a displacement amount from a surface vertex in the optical axis direction, h is a height from the optical axis in a direction orthogonal to the optical axis, a light traveling direction is set positive, R is a paraxial radius of curvature, K is a conic constant, and A4, A6, A8, A10, and A12 are aspheric coefficients. "e±XX" in each aspheric coefficient means "$\times 10^{\pm XX}$."

NUMERICAL EXAMPLE 1
UNIT: mm

SURFACE DATA

| Surface No. | r | d | nd | νd |
|---|---|---|---|---|
| 1 | 31.510 | 1.00 | 1.80400 | 46.5 |
| 2 | 13.253 | 5.81 | | |
| 3 | 384.169 | 1.00 | 1.59282 | 68.6 |
| 4 | 16.237 | 2.57 | | |
| 5 | 20.027 | 2.35 | 1.85478 | 24.8 |
| 6 | 43.038 | 2.86 | | |
| 7 | −122.389 | 1.00 | 1.49700 | 81.5 |
| 8 | 153.848 | (Variable) | | |
| 9 | −132.462 | 2.51 | 1.48749 | 70.2 |
| 10 | −22.094 | 2.50 | | |
| 11 (SP) | ∞ | 0.50 | | |
| 12 | 16.955 | 4.23 | 1.83481 | 42.7 |
| 13 | −15.911 | 1.90 | 1.90366 | 31.3 |
| 14 | 46.587 | 4.62 | | |
| 15 | 20.752 | 0.90 | 1.80400 | 46.5 |
| 16 | 8.522 | 3.98 | 1.49700 | 81.5 |
| 17 | −23.714 | (Variable) | | |
| 18 | −19.766 | 0.80 | 1.56732 | 42.8 |
| 19 | 209.263 | 2.07 | | |
| 20* | −13.721 | 2.00 | 1.53110 | 55.9 |
| 21* | −19.057 | (Variable) | | |
| 22 | −129.610 | 4.47 | 1.85150 | 40.8 |
| 23 | −26.924 | 12.29 | | |
| IP | ∞ | | | |

-continued

NUMERICAL EXAMPLE 1
UNIT: mm

ASPHERIC DATA

20th Surface

K = 0.00000e+00 A 4 = 3.64281e−04 A 6 = 2.03779e−06
A 8 = −1.61378e−08

21st Surface

K = 0.00000e+00 A 4 = 3.50063e−04 A 6 = 1.61923e−06
A 8 = −1.64849e−08

Various Data
Zoom Ratio 2.34

| | WIDE | MIDDLE | TELE |
|---|---|---|---|
| Focal Length | 12.42 | 18.65 | 29.07 |
| Fno | 4.10 | 5.13 | 6.40 |
| Half Angle of View (°) | 47.72 | 36.22 | 25.17 |
| Image Height | 11.37 | 12.86 | 13.66 |
| Overall Lens Length | 82.97 | 82.97 | 82.97 |
| BF | 12.29 | 12.29 | 12.29 |
| d 8 | 18.70 | 10.05 | 1.39 |
| d17 | 1.69 | 2.74 | 6.86 |
| d21 | 3.20 | 10.80 | 15.34 |

ZOOM LENS UNIT DATA

| Unit No. | Starting Surface | Focal Length |
|---|---|---|
| 1 | 1 | −17.76 |
| 2 | 9 | 17.38 |
| 3 | 18 | −24.70 |
| 4 | 22 | 39.13 |

NUMERICAL EXAMPLE 2
UNIT: mm

SURFACE DATA

| Surface No. | r | d | nd | νd |
|---|---|---|---|---|
| 1 | 34.396 | 1.00 | 1.77250 | 49.6 |
| 2 | 13.292 | 5.69 | | |
| 3 | −323.606 | 1.00 | 1.59282 | 68.6 |
| 4 | 16.748 | 2.92 | | |
| 5 | 20.652 | 2.29 | 1.84666 | 23.8 |
| 6 | 36.566 | (Variable) | | |
| 7 | −301.068 | 3.73 | 1.48749 | 70.2 |
| 8 | −30.039 | 4.78 | | |
| 9 (SP) | ∞ | 0.50 | | |
| 10 | 19.485 | 3.34 | 1.83481 | 42.7 |
| 11 | −14.251 | 1.90 | 1.90366 | 31.3 |
| 12 | ∞ | 4.14 | | |
| 13 | 25.728 | 1.00 | 1.83481 | 42.7 |
| 14 | 9.171 | 3.79 | 1.49700 | 81.5 |
| 15 | −26.368 | (Variable) | | |
| 16 | −23.072 | 0.80 | 1.51742 | 52.4 |
| 17 | 82.694 | 2.02 | | |
| 18* | −15.829 | 2.00 | 1.53110 | 55.9 |
| 19* | −21.570 | (Variable) | | |
| 20 | −120.000 | 4.42 | 1.77250 | 49.6 |
| 21 | −27.671 | 12.13 | | |
| IP | ∞ | | | |

-continued

NUMERICAL EXAMPLE 2
UNIT: mm

ASPHERIC DATA

18th Surface

K = 0.00000e+00 A 4 = 3.32711e−04 A 6 = 1.73403e−06
A 8 = −1.45204e−08

19th Surface

K = 0.00000e+00 A 4 = 3.39522e−04 A 6 = 1.63472e−06
A 8 = −1.61755e−08

Various Data
Zoom Ratio 2.35

| | WIDE | MIDDLE | TELE |
|---|---|---|---|
| Focal Length | 12.40 | 18.66 | 29.10 |
| Fno | 4.10 | 5.10 | 6.40 |
| Half Angle of View (°) | 47.76 | 36.21 | 25.15 |
| Image Height | 11.37 | 12.86 | 13.66 |
| Overall Lens Length | 83.44 | 83.44 | 83.44 |
| BF | 12.13 | 12.13 | 12.13 |
| d 6 | 19.82 | 10.85 | 1.88 |
| d15 | 1.77 | 2.36 | 6.01 |
| d19 | 4.41 | 12.78 | 18.10 |
| d21 | 12.13 | 12.13 | 12.13 |

ZOOM LENS UNIT DATA

| Unit No. | Starting Surface | Focal Length |
|---|---|---|
| 1 | 1 | −18.26 |
| 2 | 7 | 17.57 |
| 3 | 16 | −27.60 |
| 4 | 20 | 45.60 |

NUMERICAL EXAMPLE 3
UNIT: mm

SURFACE DATA

| Surface No. | r | d | nd | νd |
|---|---|---|---|---|
| 1 | 35.706 | 1.00 | 1.77250 | 49.6 |
| 2 | 14.414 | 5.20 | | |
| 3 | −441.444 | 1.00 | 1.59282 | 68.6 |
| 4 | 16.131 | 3.30 | | |
| 5 | 21.292 | 3.27 | 1.84666 | 23.8 |
| 6 | 38.733 | (Variable) | | |
| 7 | −260.840 | 2.46 | 1.48749 | 70.2 |
| 8 | −33.213 | 2.00 | | |
| 9 (SP) | ∞ | 2.00 | | |
| 10 | 20.926 | 4.64 | 1.85150 | 40.8 |
| 11 | −18.671 | 0.22 | | |
| 12 | −17.428 | 0.80 | 1.85478 | 24.8 |
| 13 | 218.347 | 4.07 | | |
| 14 | 28.492 | 1.00 | 1.72916 | 54.7 |
| 15 | 9.356 | 5.18 | 1.49700 | 81.5 |
| 16 | −24.952 | (Variable) | | |
| 17 | −22.720 | 0.80 | 1.57099 | 50.8 |
| 18 | 148.402 | 1.72 | | |
| 19* | −23.196 | 2.00 | 1.53110 | 55.9 |
| 20* | −30.564 | (Variable) | | |
| 21 | −120.000 | 4.34 | 1.77250 | 49.6 |
| 22 | −27.692 | (Variable) | | |
| IP | ∞ | | | |

ASPHERIC DATA

19th Surface

K = 0.00000e+00 A 4 = 2.94393e−04 A 6 = 7.13003e−07
A 8 = −1.72892e−08

-continued

NUMERICAL EXAMPLE 3
UNIT: mm

20th Surface

K = 0.00000e+00 A 4 = 3.24911e−04 A 6 = 1.01599e−06
A 8 = −1.72183e−08

Various Data
Zoom Ratio 2.35

| | WIDE | MIDDLE | TELE |
|---|---|---|---|
| Focal Length | 12.40 | 18.69 | 29.10 |
| Fno | 4.10 | 4.10 | 4.10 |
| Half Angle of View (°) | 47.76 | 36.16 | 25.15 |
| Image Height | 11.37 | 12.86 | 13.66 |
| Overall Lens Length | 82.02 | 82.02 | 82.02 |
| BF | 12.79 | 12.79 | 12.79 |
| d 6 | 19.99 | 10.92 | 1.84 |
| d16 | 1.66 | 2.03 | 5.63 |
| d20 | 2.58 | 11.29 | 16.76 |
| d22 | 12.79 | 12.79 | 12.79 |

ZOOM LENS UNIT DATA

| Unit No. | Starting Surface | Focal Length |
|---|---|---|
| 1 | 1 | −19.53 |
| 2 | 7 | 17.94 |
| 3 | 17 | −29.69 |
| 4 | 21 | 45.67 |

NUMERICAL EXAMPLE 4
UNIT: mm

SURFACE DATA

| Surface No. | r | d | nd | νd |
|---|---|---|---|---|
| 1 | 114.124 | 1.00 | 1.77250 | 49.6 |
| 2 | 12.042 | 4.29 | | |
| 3* | 43.105 | 2.50 | 1.53110 | 55.9 |
| 4* | 20.966 | 1.99 | | |
| 5 | 35.204 | 2.90 | 1.77047 | 29.7 |
| 6 | −114.527 | 1.97 | | |
| 7 | −32.492 | 1.00 | 1.49700 | 81.5 |
| 8 | −70.456 | (Variable) | | |
| 9 | 18.171 | 1.94 | 1.77250 | 49.6 |
| 10 | −529.066 | 2.48 | | |
| 11 (SP) | ∞ | 1.38 | | |
| 12 | 12.421 | 1.79 | 1.59282 | 68.6 |
| 13 | 44.069 | 0.36 | | |
| 14 | −46.037 | 1.00 | 1.68893 | 31.1 |
| 15 | 10.684 | 0.48 | | |
| 16 | 25.111 | 3.36 | 1.59282 | 68.6 |
| 17 | −21.982 | (Variable) | | |
| 18* | −18.435 | 2.00 | 1.53110 | 55.9 |
| 19* | −32.813 | (Variable) | | |
| 20 | −120.000 | 4.59 | 1.63854 | 55.4 |
| 21 | −29.908 | 11.78 | | |
| IP | ∞ | | | |

ASPHERIC DATA

3rd Surface

K = 0.00000e+00 A 4 = −8.94309e−05 A 6 = 7.11824e−07
A 8 = −3.52027e−09

4th Surface

K = 0.00000e+00 A 4 = −1.48535e−04 A 6 = 6.59805e−07
A 8 = −5.15433e−09

-continued

NUMERICAL EXAMPLE 4
UNIT: mm

18th Surface

K = 0.00000e+00 A 4 = 2.68346e−04 A 6 = 2.81044e−06
A 8 = −9.40023e−08

19th Surface

K = 0.00000e+00 A 4 = 2.67097e−04 A 6 = 1.59679e−06
A 8 = −5.11740e−08

Various Data
Zoom Ratio 2.02

| | WIDE | MIDDLE | TELE |
|---|---|---|---|
| Focal Length | 14.40 | 20.07 | 29.10 |
| Fno | 4.10 | 5.02 | 6.29 |
| Half Angle of View (°) | 43.40 | 34.24 | 25.14 |
| Image Height | 11.46 | 12.40 | 13.17 |
| Overall Lens Length | 75.06 | 75.06 | 75.06 |
| BF | 11.78 | 11.78 | 11.78 |
| d 8 | 16.11 | 8.43 | 0.74 |
| d17 | 1.84 | 1.00 | 6.15 |
| d19 | 10.29 | 18.81 | 21.35 |
| d21 | 11.78 | 11.78 | 11.78 |

ZOOM LENS UNIT DATA

| Unit No. | Starting Surface | Focal Length |
|---|---|---|
| 1 | 1 | −21.90 |
| 2 | 9 | 19.73 |
| 3 | 18 | −83.23 |
| 4 | 20 | 61.17 |

NUMERICAL EXAMPLE 5
UNIT: mm

SURFACE DATA

| Surface No. | r | d | nd | νd |
|---|---|---|---|---|
| 1 | 235.833 | 1.00 | 1.77250 | 49.6 |
| 2 | 10.085 | 4.16 | | |
| 3* | −895.559 | 2.50 | 1.53110 | 55.9 |
| 4* | 44.647 | 1.74 | | |
| 5 | 64.099 | 1.78 | 2.05090 | 26.9 |
| 6 | −162.178 | (Variable) | | |
| 7 | −459.615 | 2.29 | 1.48749 | 70.2 |
| 8 | −33.943 | 4.00 | | |
| 9 | 18.560 | 3.57 | 1.69680 | 55.5 |
| 10 | −16.150 | 1.00 | 1.90043 | 37.4 |
| 11 | −62.644 | 1.84 | | |
| 12 (SP) | ∞ | 4.68 | | |
| 13 | 25.922 | 1.00 | 1.83481 | 42.7 |
| 14 | 8.456 | 4.21 | 1.49700 | 81.5 |
| 15 | −26.343 | (Variable) | | |
| 16 | −34.878 | 0.80 | 1.61772 | 49.8 |
| 17 | 139.823 | 4.14 | | |
| 18* | −9.417 | 2.00 | 1.53110 | 55.9 |
| 19* | −12.991 | (Variable) | | |
| 20 | −120.000 | 4.63 | 1.63854 | 55.4 |
| 21 | −24.348 | 11.50 | | |
| IP | ∞ | | | |

ASPHERIC DATA

3rd Surface

K = 0.00000e+00 A 4 = −8.12193e−05 A 6 = 8.99724e−07
A 8 = −1.19209e−08

-continued

NUMERICAL EXAMPLE 5
UNIT: mm

4th Surface

K = 0.00000e+00 A 4 = −1.28410e−04 A 6 = 3.69150e−07
A 8 = −1.09948e−08

18th Surface

K = 0.00000e+00 A 4 = 2.77887e−04 A 6 = 6.15575e−06
A 8 = −2.56537e−08

19th Surface

K = 0.00000e+00 A 4 = 2.14784e−04 A 6 = 3.85389e−06
A 8 = −2.47687e−08

Various Data
Zoom Ratio 2.02

| | WIDE | MIDDLE | TELE |
|---|---|---|---|
| Focal Length | 14.40 | 20.23 | 29.10 |
| Fno | 4.10 | 5.04 | 6.40 |
| Half Angle of View (°) | 43.30 | 34.02 | 25.14 |
| Image Height | 11.42 | 12.56 | 13.22 |
| Overall Lens Length | 78.52 | 78.52 | 78.52 |
| BF | 11.50 | 11.50 | 11.50 |
| d 6 | 16.23 | 8.82 | 1.41 |
| d15 | 1.45 | 2.48 | 6.02 |
| d19 | 3.98 | 10.37 | 14.24 |
| d21 | 11.50 | 11.50 | 11.50 |

ZOOM LENS UNIT DATA

| Unit No. | Starting Surface | Focal Length |
|---|---|---|
| 1 | 1 | −18.40 |
| 2 | 7 | 18.55 |
| 3 | 16 | −28.78 |
| 4 | 20 | 46.95 |

NUMERICAL EXAMPLE 6
UNIT: mm
SURFACE DATA

| Surface No. | r | d | nd | vd |
|---|---|---|---|---|
| 1 | 93.086 | 1.00 | 1.77250 | 49.6 |
| 2 | 11.534 | 5.04 | | |
| 3* | 35.096 | 2.50 | 1.53110 | 55.9 |
| 4* | 18.745 | 1.76 | | |
| 5 | 34.034 | 2.40 | 1.84666 | 23.8 |
| 6 | 247.520 | (Variable) | | |
| 7 | 21.135 | 3.07 | 1.77250 | 49.6 |
| 8 | −83.384 | 2.42 | | |
| 9 (SP) | ∞ | 1.42 | | |
| 10 | 11.906 | 1.79 | 1.60311 | 60.6 |
| 11 | 24.109 | 0.36 | | |
| 12 | −32.365 | 1.05 | 1.72151 | 29.2 |
| 13 | 11.247 | 0.46 | | |
| 14 | 18.005 | 2.74 | 1.60311 | 60.6 |
| 15 | −16.851 | (Variable) | | |
| 16* | −20.785 | 2.00 | 1.53110 | 55.9 |
| 17* | −46.785 | (Variable) | | |
| 18 | 227.811 | 1.00 | 1.65844 | 50.9 |
| 19 | 39.504 | 5.98 | | |
| 20 | 41.856 | 6.15 | 1.72916 | 54.7 |
| 21 | −63.192 | 13.08 | | |
| IP | ∞ | | | |

ASPHERIC DATA

3rd Surface

K = 0.00000e+00 A 4 = −1.05255e−04
A 6 = 6.96967e−07 A 8 = −3.20460e−09

-continued

4th Surface

K = 0.00000e+00 A 4 = −1.71621e−04
A 6 = 6.71606e−07 A 8 = −5.21171e−09

16th Surface

K = 0.00000e+00 A 4 = 2.57526e−04
A 6 = 2.11426e−06 A 8 = −6.79744e−08

17th Surface

K = 0.00000e+00 A 4 = 2.59203e−04
A 6 = 1.45831e−06 A 8 = −4.89468e−08

Various Data
Zoom Ratio 1.97

| | WIDE | MIDDLE | TELE |
|---|---|---|---|
| Focal Length | 14.47 | 19.96 | 28.47 |
| Fno | 4.10 | 5.01 | 6.22 |
| Half Angle of View (°) | 43.35 | 34.39 | 25.63 |
| Image Height | 11.42 | 12.56 | 13.22 |
| Overall Lens Length | 72.82 | 72.82 | 72.82 |
| BF | 13.08 | 13.08 | 13.08 |
| d 6 | 15.12 | 7.96 | 0.79 |
| d15 | 1.64 | 0.67 | 4.33 |
| d17 | 1.83 | 9.96 | 13.47 |
| d21 | 13.08 | 13.08 | 13.08 |

ZOOM LENS UNIT DATA

| Unit No. | Starting Surface | Focal Length |
|---|---|---|
| 1 | 1 | −22.02 |
| 2 | 7 | 18.72 |
| 3 | 16 | −72.35 |
| 4 | 18 | 57.69 |

NUMERICAL EXAMPLE 7
UNIT: mm
SURFACE DATA

| Surface No. | r | d | nd | vd |
|---|---|---|---|---|
| 1 | ∞ | 1.50 | | |
| 2 | 49.839 | 1.40 | 1.77250 | 49.6 |
| 3 | 17.865 | 9.70 | | |
| 4 | −74.024 | 1.10 | 1.59282 | 68.6 |
| 5 | 26.453 | 2.18 | | |
| 6 | 28.144 | 5.42 | 1.80610 | 33.3 |
| 7 | 155.531 | (Variable) | | |
| 8 | 24.363 | 3.01 | 1.72916 | 54.7 |
| 9 | 133.320 | 2.61 | | |
| 10 (SP) | ∞ | 2.00 | | |
| 11 | 42.759 | 1.00 | 1.76634 | 35.8 |
| 12 | 11.137 | 5.77 | 1.72916 | 54.7 |
| 13 | −107.618 | 2.85 | | |
| 14 | −20.935 | 1.00 | 1.53172 | 48.8 |
| 15 | 38.508 | 0.15 | | |
| 16* | 29.415 | 7.00 | 1.49700 | 81.5 |
| 17* | −16.643 | (Variable) | | |
| 18 | 26.091 | 0.80 | 1.60342 | 38.0 |
| 19 | 16.431 | 9.30 | | |
| 20* | −50.394 | 2.40 | 1.53110 | 55.9 |
| 21* | −1001.831 | (Variable) | | |
| 22 | −200.000 | 3.26 | 1.90065 | 31.6 |
| 23 | −61.168 | 12.68 | | |
| IP | ∞ | | | |

ASPHERIC DATA

16th Surface

K = 0.00000e+00 A 4 = −5.16959e−05
A 6 = −1.53463e−07 A 8 = −3.31876e−09

-continued

| 17th Surface |
|---|
| K = 0.00000e+00 A 4 = 3.33206e−05<br>A 6 = −2.05294e−07 A 8 = −1.88875e−09 |
| 20th Surface |
| K = 0.00000e+00 A 4 = −3.57991e−05<br>A 6 = −1.41049e−07 A 8 = −1.54522e−09 |
| 21st Surface |
| K = 0.00000e+00 A 4 = −4.36025e−05<br>A 6 = −1.02183e−07 A 8 = −4.60803e−10 |

Various Data
Zoom Ratio 1.89

| | WIDE | MIDDLE | TELE |
|---|---|---|---|
| Focal Length | 20.60 | 28.40 | 39.00 |
| Fno | 4.10 | 4.10 | 4.10 |
| Half Angle of View (°) | 46.40 | 37.29 | 29.01 |
| Image Height | 17.94 | 19.62 | 20.74 |
| Overall Lens Length | 97.01 | 97.01 | 97.01 |
| BF | 12.68 | 12.68 | 12.68 |
| d 7 | 18.11 | 9.58 | 1.05 |
| d17 | 1.79 | 1.00 | 2.86 |
| d21 | 2.00 | 11.32 | 18.00 |
| d23 | 12.68 | 12.68 | 12.68 |

ZOOM LENS UNIT DATA

| Unit No. | Starting Surface | Focal Length |
|---|---|---|
| 1 | 1 | −30.37 |
| 2 | 8 | 24.27 |
| 3 | 18 | −41.20 |
| 4 | 22 | 96.76 |

NUMERICAL EXAMPLE 8
UNIT: mm
SURFACE DATA

| Surface No. | r | d | nd | vd |
|---|---|---|---|---|
| 1 | 42.299 | 1.50 | 1.75500 | 52.3 |
| 2 | 18.914 | 8.16 | | |
| 3 | −142.144 | 1.20 | 1.59282 | 68.6 |
| 4 | 30.217 | 5.54 | | |
| 5 | 33.034 | 2.03 | 1.96300 | 24.1 |
| 6 | 50.217 | (Variable) | | |
| 7 | 3588.151 | 3.04 | 1.53775 | 74.7 |
| 8 | −40.853 | 1.62 | | |
| 9 | 23.007 | 4.07 | 1.79952 | 42.2 |
| 10 | −26.519 | 1.01 | 1.95375 | 32.3 |
| 11 | 79.436 | 3.46 | | |
| 12 (SP) | ∞ | 5.69 | | |
| 13 | 28.102 | 1.00 | 1.85150 | 40.8 |
| 14 | 11.348 | 4.25 | 1.59522 | 67.7 |
| 15 | −45.381 | (Variable) | | |
| 16 | 41.052 | 0.80 | 1.51742 | 52.4 |
| 17 | 15.294 | 6.27 | | |
| 18 | −51.838 | 2.10 | 1.53110 | 55.9 |
| 19* | −1006.304 | (Variable) | | |
| 20 | −200.000 | 5.59 | 1.77250 | 49.6 |
| 21 | −45.565 | (Variable) | | |
| IP | ∞ | | | |

ASPHERIC DATA

| 18th Surface |
|---|
| K = 0.00000e+00 A 4 = −2.18376e−04<br>A 6 = 8.06571e−07 A 8 = −7.88304e−09 |

-continued

| 19th Surface |
|---|
| K = 0.00000e+00 A 4 = −1.88281e−04<br>A 6 = 7.88400e−07 A 8 = −4.74781e−09 |

Various Data
Zoom Ratio 2.35

| | WIDE | MIDDLE | TELE |
|---|---|---|---|
| Focal Length | 20.60 | 31.11 | 48.50 |
| Fno | 4.10 | 5.20 | 5.88 |
| Half Angle of View (°) | 46.40 | 34.81 | 24.04 |
| Image Height | 18.22 | 20.32 | 21.64 |
| Overall Lens Length | 106.52 | 106.52 | 106.52 |
| BF | 19.41 | 19.41 | 19.41 |
| d 6 | 26.05 | 13.88 | 1.70 |
| d15 | 1.00 | 2.05 | 6.67 |
| d19 | 2.72 | 13.84 | 21.40 |
| d21 | 19.41 | 19.41 | 19.41 |

ZOOM LENS UNIT DATA

| Unit No. | Starting Surface | Focal Length |
|---|---|---|
| 1 | 1 | −28.51 |
| 2 | 7 | 23.49 |
| 3 | 16 | −31.34 |
| 4 | 20 | 75.20 |

NUMERICAL EXAMPLE 9
UNIT: mm
SURFACE DATA

| Surface No. | r | d | nd | vd |
|---|---|---|---|---|
| 1 | 60.703 | 1.30 | 1.95375 | 32.3 |
| 2 | 10.568 | 5.26 | | |
| 3* | −158.794 | 2.00 | 1.53110 | 55.9 |
| 4* | 35.904 | 0.68 | | |
| 5 | 69.552 | 2.59 | 1.85478 | 24.8 |
| 6 | −37.356 | 0.90 | | |
| 7 | −41.573 | 1.00 | 1.43875 | 94.7 |
| 8 | −114.793 | (Variable) | | |
| 9 | 19.470 | 2.27 | 1.65160 | 58.5 |
| 10 | −126.753 | 6.20 | | |
| 11 (SP) | ∞ | 0.80 | | |
| 12 | 13.509 | 2.32 | 1.49700 | 81.5 |
| 13 | −29.196 | 0.23 | | |
| 14 | −18.502 | 2.50 | 1.59551 | 39.2 |
| 15 | 10.390 | 1.45 | | |
| 16 | 16.003 | 2.95 | 1.43875 | 94.7 |
| 17 | −17.071 | (Variable) | | |
| 18* | −18.646 | 1.50 | 1.53110 | 55.9 |
| 19* | −46.212 | (Variable) | | |
| 20 | −40.654 | 3.48 | 1.43875 | 94.7 |
| 21 | −20.238 | 13.34 | | |
| IP | ∞ | | | |

ASPHERIC DATA

| 3rd Surface |
|---|
| K = 0.00000e+00 A 4 = −1.84708e−04<br>A 6 = 1.47430e−06 A 8 = −1.09499e−08 |
| 4th Surface |
| K = 0.00000e+00 A 4 = 2.31582e−04<br>A 6 = 1.38450e−06 A 8 = −1.10945e−08 |
| 18th Surface |
| K = 0.00000e+00 A 4 = 4.14762e−04<br>A 6 = −1.81540e−06 A 8 = −1.40506e−09 |

-continued

| 19th Surface |
|---|
| K = 0.00000e+00 A 4 = 4.21395e−04<br>A 6 = −2.16529e−06 A 8 = 8.23735e−09 |

| Various Data<br>Zoom Ratio 2.01 | | | |
|---|---|---|---|
| | WIDE | MIDDLE | TELE |
| Focal Length | 14.45 | 20.17 | 29.09 |
| Fno | 4.10 | 5.05 | 6.40 |
| Half Angle of View (°) | 43.39 | 34.10 | 25.15 |
| Image Height | 11.46 | 12.41 | 13.18 |
| Overall Lens Length | 77.99 | 77.99 | 77.99 |
| BF | 13.34 | 13.34 | 13.34 |
| d 8 | 16.17 | 8.48 | 0.80 |
| d17 | 0.80 | 1.51 | 7.58 |
| d19 | 10.26 | 17.23 | 18.84 |
| d21 | 13.34 | 13.34 | 13.34 |

ZOOM LENS UNIT DATA

| Unit No. | Starting Surface | Focal Length |
|---|---|---|
| 1 | 1 | −18.40 |
| 2 | 9 | 20.41 |
| 3 | 18 | −59.99 |
| 4 | 20 | 87.31 |

NUMERICAL EXAMPLE 10
UNIT: mm
SURFACE DATA

| Surface No. | r | d | nd | vd |
|---|---|---|---|---|
| 1 | 42.644 | 1.30 | 1.72916 | 54.7 |
| 2 | 17.764 | 8.77 | | |
| 3 | −70.406 | 1.20 | 1.53775 | 74.7 |
| 4 | 25.301 | 2.36 | | |
| 5 | 25.884 | 4.26 | 1.62588 | 35.7 |
| 6 | 209.726 | (Variable) | | |
| 7 | 25.792 | 2.12 | 1.59522 | 67.7 |
| 8 | 539.599 | 5.57 | | |
| 9 (SP) | ∞ | 0.88 | | |
| 10 | 59.108 | 1.00 | 1.69895 | 30.1 |
| 11 | 19.640 | 2.76 | 1.72916 | 54.7 |
| 12 | −88.410 | 2.69 | | |
| 13 | −18.122 | 1.01 | 1.54072 | 47.2 |
| 14 | 71.719 | 2.69 | | |
| 15* | 23.626 | 4.90 | 1.43875 | 94.7 |
| 16* | −14.207 | (Variable) | | |
| 17 | 24.461 | 1.00 | 1.51633 | 64.1 |
| 18 | 15.091 | 9.99 | | |
| 19* | −51.360 | 2.00 | 1.53110 | 55.9 |
| 20* | 199.736 | (Variable) | | |
| 21 | −991.849 | 2.03 | 2.05090 | 26.9 |
| 22 | −167.475 | 12.67 | | |
| IP | ∞ | | | |

ASPHERIC DATA

| 15th Surface |
|---|
| K = 0.00000e+00 A 4 = −2.76672e−05<br>A 6 = −3.81028e−08 A 8 = 1.77147e−09<br>16th Surface |
| K = 0.00000e+00 A 4 = 8.66431e−05<br>A 6 = −1.50654e−07 A 8 = 3.16848e−09<br>19th Surface |
| K = 0.00000e+00 A 4 = −2.50400e−05<br>A 6 = −1.73349e−07 A 8 = −1.30647e−09 |

-continued

| 20th Surface |
|---|
| K = 0.00000e+00 A 4 = −4.36025e−05<br>A 6 = −1.02183e−07 A 8 = −4.60803e−10 |

| Various Data<br>Zoom Ratio 1.88 | | | |
|---|---|---|---|
| | WIDE | MIDDLE | TELE |
| Focal Length | 20.92 | 28.94 | 39.31 |
| Fno | 4.10 | 4.10 | 4.10 |
| Half Angle of View (°) | 45.96 | 36.78 | 28.82 |
| Image Height | 18.00 | 19.62 | 20.76 |
| Overall Lens Length | 91.22 | 91.22 | 91.22 |
| BF | 12.67 | 12.67 | 12.67 |
| d 6 | 17.87 | 9.33 | 0.80 |
| d16 | 2.47 | 0.80 | 1.28 |
| d20 | 1.69 | 11.90 | 19.95 |
| d22 | 12.67 | 12.67 | 12.67 |

ZOOM LENS UNIT DATA

| Unit No. | Starting Surface | Focal Length |
|---|---|---|
| 1 | 1 | −33.47 |
| 2 | 7 | 23.91 |
| 3 | 17 | −36.80 |
| 4 | 21 | 191.50 |

NUMERICAL EXAMPLE 11
UNIT: mm
SURFACE DATA

| Surface No. | r | d | nd | vd |
|---|---|---|---|---|
| 1 | 620.156 | 1.00 | 1.80610 | 40.9 |
| 2 | 13.951 | 3.20 | | |
| 3* | 31.386 | 1.77 | 1.53110 | 55.9 |
| 4* | 16.340 | 2.55 | | |
| 5 | −2188.375 | 1.00 | 1.43875 | 94.7 |
| 6 | 22.775 | 3.74 | 1.90043 | 37.4 |
| 7 | −107.410 | 1.34 | | |
| 8 | −53.431 | 1.00 | 1.43875 | 94.7 |
| 9 | −351.116 | (Variable) | | |
| 10 | 18.205 | 2.17 | 1.69680 | 55.5 |
| 11 | −182.560 | 2.82 | | |
| 12 (SP) | ∞ | 0.80 | | |
| 13 | 11.712 | 2.38 | 1.43875 | 94.7 |
| 14 | −80.486 | 0.31 | | |
| 15 | −25.729 | 2.00 | 1.60342 | 38.0 |
| 16 | 10.136 | 1.04 | | |
| 17 | 20.451 | 2.17 | 1.43875 | 94.7 |
| 18 | −17.817 | (Variable) | | |
| 19* | −40.343 | 1.50 | 1.53110 | 55.9 |
| 20* | 106.642 | (Variable) | | |
| 21 | −547.596 | 5.61 | 1.49700 | 81.5 |
| 22 | −21.883 | (Variable) | | |
| IP | 8 | | | |

ASPHERIC DATA

| 3rd Surface |
|---|
| K = 0.00000e+00 A 4 = −1.92346e−04<br>A 6 = 1.46585e−06 A 8 = −5.19278e−09<br>4th Surface |
| K = 0.00000e+00 A 4 = −2.49552e−04<br>A 6 = 1.56459e−06 A 8 = −7.02285e−09<br>19th Surface |
| K = 0.00000e+00 A 4 = 2.25885e−04<br>A 6 = −7.11818e−07 A 8 = −1.70513e−08 |

-continued

| 20th Surface |
|---|
| K = 0.00000e+00 A 4 = 2.83610e−04 |
| A 6 = −1.54983e−06 A 8 = −2.79368e−09 |

Various Data
Zoom Ratio 2.01

| | WIDE | MIDDLE | TELE |
|---|---|---|---|
| Focal Length | 14.44 | 20.17 | 29.09 |
| Fno | 4.10 | 5.07 | 6.40 |
| Half Angle of View (°) | 43.41 | 34.11 | 25.15 |
| Image Height | 11.46 | 12.41 | 13.18 |
| Overall Lens Length | 74.83 | 74.83 | 74.83 |
| BF | 13.10 | 13.10 | 13.10 |
| d 9 | 16.17 | 8.48 | 0.80 |
| d18 | 2.41 | 3.08 | 8.46 |
| d20 | 6.75 | 13.76 | 16.06 |
| d22 | 13.10 | 13.10 | 13.10 |

ZOOM LENS UNIT DATA

| Unit No. | Starting Surface | Focal Length |
|---|---|---|
| 1 | 1 | −22.35 |
| 2 | 10 | 20.11 |
| 3 | 19 | −54.92 |
| 4 | 21 | 45.70 |

NUMERICAL EXAMPLE 12
UNIT: mm
SURFACE DATA

| Surface No. | r | d | nd | vd |
|---|---|---|---|---|
| 1 | 333.322 | 1.00 | 1.59145 | 68.4 |
| 2 | 14.457 | 2.17 | | |
| 3* | 16.664 | 1.75 | 1.53110 | 55.9 |
| 4* | 13.429 | 3.12 | | |
| 5 | 72.731 | 0.99 | 1.43830 | 95.0 |
| 6 | 15.506 | 1.36 | | |
| 7 | 18.208 | 3.08 | 1.80652 | 46.7 |
| 8 | 82.353 | 2.05 | | |
| 9 | −59.712 | 1.00 | 1.43846 | 94.8 |
| 10 | 1265.032 | (Variable) | | |
| 11 | 16.222 | 1.79 | 1.69462 | 57.7 |
| 12 | −120.338 | 0.80 | | |
| 13 (SP) | ∞ | 0.80 | | |
| 14 | 8.920 | 1.59 | 1.51616 | 79.3 |
| 15 | 24.467 | 0.35 | | |
| 16 | −291.423 | 1.00 | 1.60753 | 37.9 |
| 17 | 7.730 | 2.37 | | |
| 18 | 15.894 | 1.71 | 1.43787 | 95.3 |
| 19 | −25.062 | (Variable) | | |
| 20* | −20.249 | 1.28 | 1.53110 | 55.9 |
| 21* | −67.405 | (Variable) | | |
| 22 | 1468.914 | 4.86 | 1.49667 | 81.9 |
| 23 | −26.178 | 13.10 | | |
| IP | ∞ | | | |

ASPHERIC DATA

| 3rd Surface |
|---|
| K = 0.00000e+00 A 4 = −1.53281e−04 |
| A 6 = 1.08426e−06 A 8 = −4.18904e−09 |
| 4th Surface |
| K = 0.00000e+00 A 4 = −2.14777e−04 |
| A 6 = 1.34839e−06 A 8 = −7.81236e−09 |
| 20th Surface |
| K = 0.00000e+00 A 4 = 6.82662e−04 |
| A 6 = −2.35509e−06 A 8 = −8.17593e−08 |

-continued

| 21st Surface |
|---|
| K = 0.00000e+00 A 4 = 7.14470e−04 |
| A 6 = −3.68516e−06 A 8 = −2.76365e−08 |

Various Data
Zoom Ratio 2.02

| | WIDE | MIDDLE | TELE |
|---|---|---|---|
| Focal Length | 14.43 | 20.17 | 29.10 |
| Fno | 4.10 | 5.00 | 6.16 |
| Half Angle of View (°) | 43.42 | 34.11 | 25.14 |
| Image Height | 11.46 | 12.41 | 13.18 |
| Overall Lens Length | 70.63 | 70.63 | 70.63 |
| BF | 13.10 | 13.10 | 13.10 |
| d10 | 16.17 | 8.49 | 0.80 |
| d19 | 1.57 | 0.80 | 3.54 |
| d21 | 6.72 | 15.18 | 20.12 |
| d23 | 13.10 | 13.10 | 13.10 |

ZOOM LENS UNIT DATA

| Unit No. | Starting Surface | Focal Length |
|---|---|---|
| 1 | 1 | −24.90 |
| 2 | 11 | 18.46 |
| 3 | 20 | −55.02 |
| 4 | 22 | 51.84 |

NUMERICAL EXAMPLE 13
UNIT: mm
SURFACE DATA

| Surface No. | r | d | nd | vd |
|---|---|---|---|---|
| 1 | 206.545 | 1.30 | 1.72916 | 54.7 |
| 2 | 11.330 | 4.19 | | |
| 3* | 62.888 | 1.81 | 1.53110 | 55.9 |
| 4* | 20.219 | 0.80 | | |
| 5 | 24.916 | 2.72 | 1.90043 | 37.4 |
| 6 | −390.408 | 2.23 | | |
| 7 | −25.898 | 1.02 | 1.43875 | 94.7 |
| 8 | −47.695 | (Variable) | | |
| 9 | 18.212 | 1.40 | 1.69680 | 55.5 |
| 10 | 63.288 | 2.25 | | |
| 11 (SP) | ∞ | 0.80 | | |
| 12 | 11.731 | 2.68 | 1.53775 | 74.7 |
| 13 | −13.536 | 0.17 | | |
| 14 | −12.668 | 1.50 | 1.57099 | 50.8 |
| 15 | 6.966 | 0.63 | | |
| 16 | 8.050 | 3.16 | 1.43875 | 94.7 |
| 17 | −26.152 | (Variable) | | |
| 18* | −12.552 | 1.50 | 1.53110 | 55.9 |
| 19* | −21.575 | (Variable) | | |
| 20 | −28.270 | 2.55 | 1.49700 | 81.5 |
| 21 | −19.416 | 16.10 | | |
| IP | ∞ | | | |

ASPHERIC DATA

| 3rd Surface |
|---|
| K = 0.00000e+00 A 4 = −1.14002e−04 |
| A 6 = 1.79201e−06 A 8 = −9.57523e−09 |
| 4th Surface |
| K = 0.00000e+00 A 4 = −1.76654e−04 |
| A 6 = 1.89620e−06 A 8 = −1.42839e−08 |
| 18th Surface |
| K = 0.00000e+00 A 4 = 9.49757e−04 |
| A 6 = 5.59399e−06 A 8 = −2.76077e−07 |

-continued

| 19th Surface | | | |
|---|---|---|---|
| K = 0.00000e+00 A 4 = 8.99649e−04 | | | |
| A 6 = 3.06165e−06 A 8 = −1.04329e−07 | | | |
| Various Data | | | |
| Zoom Ratio 2.02 | | | |
| | WIDE | MIDDLE | TELE |
| Focal Length | 14.42 | 20.24 | 29.10 |
| Fno | 4.10 | 5.06 | 6.28 |
| Half Angle of View (°) | 43.44 | 34.01 | 25.15 |
| Image Height | 11.46 | 12.41 | 13.18 |
| Overall Lens Length | 69.58 | 69.58 | 69.58 |
| BF | 16.10 | 16.10 | 16.10 |
| d 8 | 16.17 | 8.48 | 0.80 |
| d17 | 2.79 | 0.79 | 2.42 |
| d19 | 3.84 | 13.52 | 19.58 |
| d21 | 16.10 | 16.10 | 16.10 |

ZOOM LENS UNIT DATA

| Unit No. | Starting Surface | Focal Length |
|---|---|---|
| 1 | 1 | −23.46 |
| 2 | 9 | 18.06 |
| 3 | 18 | −59.97 |
| 4 | 20 | 113.86 |

TABLES 1 and 2 summarize various values in each example.

TABLE 1

| | | Ex 1 | Ex 2 | Ex 3 | Ex 4 | Ex 5 | Ex 6 | Ex 7 |
|---|---|---|---|---|---|---|---|---|
| | fw | 12.42 | 12.40 | 12.40 | 14.40 | 14.40 | 14.47 | 20.60 |
| | ft | 29.07 | 29.10 | 29.10 | 29.10 | 29.10 | 28.47 | 39.00 |
| | f1 | −17.76 | −18.26 | −19.53 | −21.90 | −18.40 | −22.02 | −30.37 |
| | f2 | 17.38 | 17.57 | 17.94 | 19.73 | 18.55 | 18.72 | 24.27 |
| | f3 | −24.70 | −27.60 | −29.69 | −83.23 | −28.78 | −72.35 | −41.20 |
| | f4 | 39.13 | 45.60 | 45.67 | 61.17 | 46.95 | 57.69 | 96.76 |
| | LD1 | 16.60 | 12.91 | 13.77 | 15.65 | 11.18 | 12.69 | 19.79 |
| | TTL | 82.97 | 83.44 | 82.02 | 75.06 | 78.52 | 72.82 | 95.51 |
| | BFw | 12.29 | 12.13 | 12.79 | 11.78 | 11.50 | 13.08 | 12.68 |
| | fn1 | −29.16 | −28.64 | −31.94 | −17.50 | −13.66 | −17.13 | −36.75 |
| | fn2 | −28.63 | −26.83 | −26.23 | −79.99 | −80.00 | −80.00 | −32.74 |
| | fp1 | 41.85 | 52.58 | 51.42 | 35.25 | 43.89 | 46.37 | 41.83 |
| (1) | (−f1)/f2 | 1.02 | 1.04 | 1.09 | 1.11 | 0.99 | 1.18 | 1.25 |
| (2) | (−f1)/f4 | 0.45 | 0.40 | 0.43 | 0.36 | 0.39 | 0.38 | 0.31 |
| (3) | LD1/TTL | 0.20 | 0.15 | 0.17 | 0.21 | 0.14 | 0.17 | 0.21 |
| (4) | BFw/(−f1) | 0.69 | 0.66 | 0.65 | 0.54 | 0.62 | 0.59 | 0.42 |
| (5) | BPw/TTL | 0.15 | 0.15 | 0.16 | 0.16 | 0.15 | 0.18 | 0.13 |
| (6) | TTL/(−f1) | 4.67 | 4.57 | 4.20 | 3.43 | 4.27 | 3.31 | 3.14 |
| (7) | TTL/fw | 6.68 | 6.73 | 6.61 | 5.21 | 5.45 | 5.03 | 4.64 |
| (8) | f2/(−f3) | 0.70 | 0.64 | 0.60 | 0.24 | 0.64 | 0.26 | 0.59 |
| (9) | f2/f4 | 0.44 | 0.39 | 0.39 | 0.32 | 0.40 | 0.32 | 0.25 |
| (10) | (−f3)/f4 | 0.63 | 0.61 | 0.65 | 1.36 | 0.61 | 1.25 | 0.43 |
| (11) | (−f1)/fw | 1.43 | 1.47 | 1.57 | 1.52 | 1.28 | 1.52 | 1.47 |
| (12) | (−f1)/ft | 0.61 | 0.63 | 0.67 | 0.75 | 0.63 | 0.77 | 0.78 |
| (13) | β2t/β2w | 1.90 | 1.88 | 1.87 | 1.84 | 1.71 | 1.76 | 1.52 |
| (14) | β3t/β3w | 1.23 | 1.25 | 1.25 | 1.10 | 1.18 | 1.12 | 1.24 |
| (15) | fn1/f1 | 1.64 | 1.57 | 1.64 | 0.80 | 0.74 | 0.78 | 1.21 |
| (16) | fn2/f1 | 1.61 | 1.47 | 1.34 | 3.65 | 4.35 | 3.63 | 1.08 |
| (17) | fp1/(−f1) | 2.36 | 2.88 | 2.63 | 1.61 | 2.39 | 2.11 | 1.38 |

TABLE 2

| | | Ex 8 | Ex 9 | Ex 10 | Ex 11 | Ex 12 | Ex 13 |
|---|---|---|---|---|---|---|---|
| | fw | 20.60 | 14.45 | 20.92 | 14.44 | 14.43 | 14.42 |
| | ft | 48.50 | 29.09 | 39.31 | 29.09 | 29.10 | 29.10 |
| | f1 | −28.51 | −18.40 | −33.47 | −22.35 | −24.90 | −23.46 |
| | f2 | 23.49 | 20.41 | 23.91 | 20.11 | 18.46 | 18.06 |
| | f3 | −31.34 | −59.99 | −36.80 | −54.92 | −55.02 | −59.97 |

TABLE 2-continued

| | | Ex 8 | Ex 9 | Ex 10 | Ex 11 | Ex 12 | Ex 13 |
|---|---|---|---|---|---|---|---|
| | f4 | 75.20 | 87.31 | 191.50 | 45.70 | 51.84 | 113.86 |
| | LD1 | 18.43 | 13.73 | 17.88 | 15.60 | 16.52 | 14.07 |
| | TTL | 106.52 | 77.99 | 91.22 | 74.83 | 70.63 | 69.58 |
| | BFw | 19.41 | 13.34 | 12.67 | 13.10 | 13.10 | 16.10 |
| | fn1 | −46.60 | −13.59 | −42.70 | −17.72 | −25.58 | −16.49 |
| | fn2 | −41.93 | −54.94 | −34.46 | −66.91 | −160.29 | −56.95 |
| | fp1 | 94.76 | 28.75 | 46.76 | 21.16 | 28.38 | 26.09 |
| (1) | (−f1)/f2 | 1.21 | 0.90 | 1.40 | 1.11 | 1.35 | 1.30 |
| (2) | (−f1)/f4 | 0.38 | 0.21 | 0.17 | 0.49 | 0.48 | 0.21 |
| (3) | LD1/TTL | 0.17 | 0.18 | 0.20 | 0.21 | 0.23 | 0.20 |
| (4) | BFw/(−f1) | 0.68 | 0.73 | 0.38 | 0.59 | 0.53 | 0.69 |
| (5) | BPw/TTL | 0.18 | 0.17 | 0.14 | 0.18 | 0.19 | 0.23 |
| (6) | TTL/(−f1) | 3.74 | 4.24 | 2.73 | 3.35 | 2.84 | 2.97 |
| (7) | TTL/fw | 5.17 | 5.40 | 4.36 | 5.18 | 4.89 | 4.82 |
| (8) | f2/(−f3) | 0.75 | 0.34 | 0.65 | 0.37 | 0.34 | 0.30 |
| (9) | f2/f4 | 0.31 | 0.23 | 0.12 | 0.44 | 0.36 | 0.16 |
| (10) | (−f3)/f4 | 0.42 | 0.69 | 0.19 | 1.20 | 1.06 | 0.53 |
| (11) | (−f1)/fw | 1.38 | 1.27 | 1.60 | 1.55 | 1.73 | 1.63 |
| (12) | (−f1)/ft | 0.59 | 0.63 | 0.85 | 0.77 | 0.86 | 0.81 |
| (13) | β2t/β2w | 1.90 | 1.88 | 1.87 | 1.84 | 1.71 | 1.76 |
| (14) | β3t/β3w | 1.23 | 1.25 | 1.25 | 1.10 | 1.18 | 1.12 |
| (15) | fn1/f1 | 1.63 | 0.74 | 1.28 | 0.79 | 1.03 | 0.70 |
| (16) | fn2/f1 | 1.47 | 2.99 | 1.03 | 2.99 | 6.44 | 2.43 |
| (17) | fp1/(−f1) | 3.32 | 1.56 | 1.40 | 0.95 | 1.14 | 1.11 |

Image Pickup Apparatus

Figure 27:
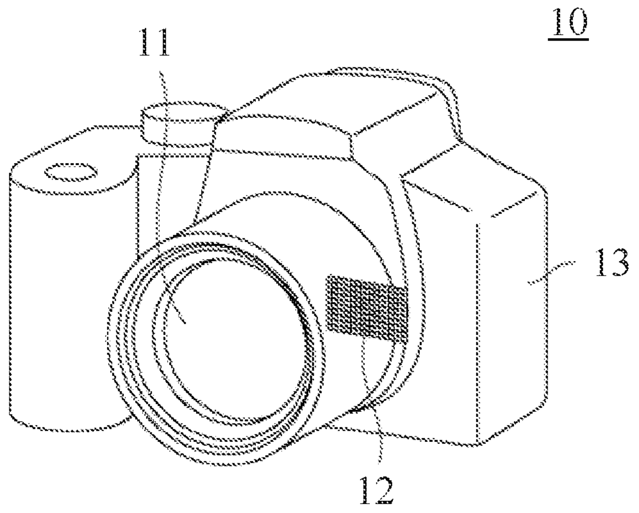
FIG. 27 is a schematic diagram of an image pickup apparatus.

Referring now to FIG. 27, a description will be given of a digital still camera (image pickup apparatus) using a zoom lens as an imaging optical system. The zoom lens may be configured according to each of the examples discussed above. FIG. 27 illustrates a configuration of an image pickup apparatus 10. The image pickup apparatus 10 includes a camera body 13, a lens apparatus 11 including a zoom lens according to any one of Examples 1 to 13, and an image sensor (light receiving element) 12 configured to photoelectrically convert an image formed by the zoom lens. The image sensor 12 can use a CCD sensor or a CMOS sensor. The lens apparatus 11 and the camera body 13 may be integrated with each other, or may be detachably configured. The camera body 13 may be a so-called single-lens reflex camera having a quick turn mirror, or a so-called mirrorless camera without a quick turn mirror. The image pickup apparatus 10 according to this example can be small and lightweight, and have high optical performance.

The image pickup apparatus 10 according to this example is not limited to the digital still camera illustrated in FIG. 27, but is applicable to various image pickup apparatuses such as a broadcasting camera, a film-based camera, a surveillance camera, and the like.

Image Pickup System

An image pickup system (surveillance camera system) may include the zoom lens according to any one of the above examples and a control unit configured to control the zoom lens. In this case, the control unit is configured to control the zoom lens so that each lens unit moves as described above during zooming, focusing, and image stabilization. The control unit does not have to be integrated with the zoom lens, and may be separate from the zoom lens. For example, a control unit (control apparatus) disposed remotely from a driving unit configured to drive each lens in the zoom lens may include a transmission unit configured to transmit a control signal (command) for controlling the zoom lens. This control unit can remotely control the zoom lens.

By providing an operation unit such as a controller and buttons for remotely operating the zoom lens to the control unit, the zoom lens may be controlled according to the user's input to the operation unit. For example, the operation unit may include an enlargement button and a reduction button. A signal may be sent from the control unit to the driving unit of the zoom lens L0 so that in a case where the user presses the enlargement button, the magnification of the zoom lens increases, and in a case where the user presses the reduction button, the magnification of the zoom lens decreases.

The image pickup system may include a display unit such as a liquid crystal panel configured to display information (moving state) about the zoom of the zoom lens. The information about the zoom of the zoom lens is, for example, the zoom magnification (zoom state) and a moving amount (moving state) of each lens unit.

In this case, the user can remotely operate the zoom lens through the operation unit while viewing information about the zoom of the zoom lens displayed on the display unit. The display unit and the operation unit may be integrated by adopting a touch panel or the like.

The fourth lens unit in the zoom lens according to any one of the above examples may consist of a single positive fixed focal length lens.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide a negative lead type wide-angle zoom lens that is compact and lightweight yet has high optical performance over the entire zoom range.

This application claims the benefit of Japanese Patent Application No. 2022-188559, filed on Nov. 25, 2022, which is hereby incorporated by reference herein in its entirety.

What is claimed is:

1. A zoom lens comprising a plurality of lens units, the plurality of lens units consisting of, in order from an object side to an image side, a first lens unit having negative refractive power, a second lens unit having positive refractive power, a third lens unit having negative refractive power, and a fourth lens unit having positive refractive power, wherein a distance between adjacent lens units changes during zooming from a wide-angle end to a telephoto end, wherein the first lens unit is fixed relative to an image plane during zooming, wherein the first lens unit consists of, in order from the object side to the image side, a negative lens, a negative lens, a positive lens, and a negative lens, wherein the third lens unit is a focus lens unit that moves during focusing, wherein the third lens unit consists of a single negative fixed focal length lens, and wherein the following inequalities are satisfied:

$$0.85<(-f1)/f2<2.00$$

$$0.00<(-f1)/f4<0.55$$

$$0.00<LD1/TTL<0.27$$

where f1 is a focal length of the first lens unit, f2 is a focal length of the second lens unit, f4 is a focal length of the fourth lens unit, LD1 is a distance on an optical axis from a lens surface on the object side of a lens closest to an object in the first lens unit to a lens surface on the image side of a lens closest to the image plane in the first lens unit, and TTL is a distance on the optical axis from the lens surface on the object side of the lens closest to the object in the zoom lens at the wide-angle end to the image plane.

2. The zoom lens according to claim 1, wherein the following inequality is satisfied:

$$0.30<Bfw/(-f1)<1.50$$

where BFw an air conversion amount of a distance on the optical axis from a lens surface on the image side of the lens closest to the image plane in the zoom lens at the wide-angle end to the image plane.

3. The zoom lens according to claim 1, wherein the following inequality is satisfied:

$$0.07<BFw/TTL<0.30$$

where BFw an air conversion amount of a distance on the optical axis from a lens surface on the image side of the lens closest to the image plane in the zoom lens at the wide-angle end to the image plane.

4. The zoom lens according to claim 1, wherein the following inequality is satisfied:

$$2.0<TTL/(-f1)<6.0.$$

5. The zoom lens according to claim 1, wherein the following inequality is satisfied:

$$3.0<TTL/fw<7.5$$

where fw is a focal length of the zoom lens at the wide-angle end.

6. The zoom lens according to claim 1, wherein the following inequality is satisfied:

$$0.1<f2/(-f3)<1.5$$

where f3 is a focal length of the third lens unit.

7. The zoom lens according to claim 1, wherein the following inequality is satisfied:

$$0.05<f2/f4<0.80.$$

8. The zoom lens according to claim 1, wherein the following inequality is satisfied:

$$0.1<(-f3)/f4<2.0$$

where f3 is a focal length of the third lens unit.

9. The zoom lens according to claim 1, wherein the following inequality is satisfied:

$$0.5<(-f1)/fw<2.5$$

where fw is a focal length of the zoom lens at the wide-angle end.

10. The zoom lens according to claim 1, wherein the following inequality is satisfied:

$$0.2<(-f1)/ft<1.4$$

where ft is a focal length of the zoom lens at the telephoto end.

11. The zoom lens according to claim 1, wherein the following inequality is satisfied:

$$0.5<\beta 2t/\beta 2w<3.0$$

where β2t is lateral magnification of the second lens unit at the telephoto end, and β2w is lateral magnification of the second lens unit at the wide-angle end.

12. The zoom lens according to claim 1, wherein the following inequality is satisfied:

$$0.5<\beta 3t/\beta 3w<2.0$$

where β3t is lateral magnification of the third lens unit at the telephoto end, and β3w is lateral magnification of the third lens unit at the wide-angle end.

13. The zoom lens according to claim 1, wherein the fourth lens unit is fixed relative to the image plane during zooming from the wide-angle end to the telephoto end.

14. The zoom lens according to claim 1, wherein the second lens unit includes an aperture stop.

15. The zoom lens according to claim 1, wherein the fourth lens unit consists of a single positive fixed focal length lens.

16. A zoom lens comprising a plurality of lens units, the plurality of lens units consisting of, in order from an object side to an image side, a first lens unit having negative refractive power, a second lens unit having positive refractive power, a third lens unit having negative refractive power, and a fourth lens unit having positive refractive power, wherein a distance between adjacent lens units changes during zooming from a wide-angle end to a telephoto end, wherein the first lens unit is fixed relative to an image plane during zooming, wherein the first lens unit consists of, in order from the object side to the image side, a negative lens, a negative lens, a negative lens, a positive lens, and a negative lens, and wherein the following inequalities are satisfied:

$$0.85<(-f1)/f2<2.00$$

$$0.00<(-f1)/f4<0.55$$

$$0.00<LD1/TTL<0.27$$

where f1 is a focal length of the first lens unit, f2 is a focal length of the second lens unit, f4 is a focal length of the fourth lens unit, LD1 is a distance on an optical axis from a lens surface on the object side of a lens closest to an object in the first lens unit to a lens surface on the image side of a lens closest to the image plane in the first lens unit, and TTL is a distance on the optical axis from the lens surface on the object side of the lens closest to the object in the zoom lens at the wide-angle end to the image plane.

17. An image pickup apparatus comprising:

a zoom lens; and an image sensor configured to receive image light formed by the zoom lens, the zoom lens comprising a plurality of lens units, the plurality of lens units consisting of, in order from an object side to an image side, a first lens unit having negative refractive power, a second lens unit having positive refractive power, a third lens unit having negative refractive power, and a fourth lens unit having positive refractive power, wherein a distance between adjacent lens units changes during zooming from a wide-angle end to a telephoto end, wherein the first lens unit is fixed relative to an image plane during zooming, wherein the first lens unit consists of, in order from the object side to the image side, a negative lens, a negative lens, a positive lens, and a negative lens, wherein the third lens unit is a focus lens unit that moves during focusing, wherein the third lens unit consists of a single negative fixed focal length lens, and wherein the following inequalities are satisfied:

$$0.85<(-f1)/f2<2.00$$

$$0.00<(-f1)/f4<0.55$$

$$0.00<LD1/TTL<0.27$$

where f1 is a focal length of the first lens unit, f2 is a focal length of the second lens unit, f4 is a focal length of the fourth lens unit, LD1 is a distance on an optical axis from a lens surface on the object side of a lens closest to an object in the first lens unit to a lens surface on the image side of a lens closest to the image plane in the first lens unit, and TTL is a distance on the optical axis from the lens surface on the object side of the lens closest to the object in the zoom lens at the wide-angle end to the image plane.

* * * * *